United States Patent [19]
Myoga et al.

[11] Patent Number: 5,233,258
[45] Date of Patent: Aug. 3, 1993

[54] ULTRASONIC SHEET FEEDER, LOW-PROFILE ULTRASONIC MOTOR, AND METHOD OF DRIVING THE SAME

[75] Inventors: Osamu Myoga; Takeshi Inoue; Michihisa Suga, all of Tokyo, Japan

[73] Assignee: NEC Corporation, Tokyo, Japan

[21] Appl. No.: 854,541

[22] Filed: Mar. 19, 1992

[30] Foreign Application Priority Data

Mar. 28, 1991 [JP] Japan .................................. 3-64295

[51] Int. Cl.$^5$ ............................................. H01L 41/08
[52] U.S. Cl. ..................................... 310/323; 310/328
[58] Field of Search ............... 310/316, 317, 323, 328; 318/116–118

[56] References Cited

U.S. PATENT DOCUMENTS

| | | | |
|---|---|---|---|
| 4,193,703 | 3/1980 | Sakmann | 310/328 |
| 4,339,682 | 7/1982 | Toda et al. | 310/321 |
| 4,613,782 | 9/1986 | Mori et al. | 310/323 |
| 5,062,622 | 11/1991 | Kataoka et al. | 310/323 X |
| 5,089,740 | 2/1992 | Ono | 310/328 |
| 5,132,582 | 7/1992 | Hayashi et al. | 310/323 |
| 5,149,080 | 9/1992 | Yamamoto | 310/323 X |

FOREIGN PATENT DOCUMENTS

| | | |
|---|---|---|
| 63-290176 | 11/1988 | Japan . |
| 63-294270 | 11/1988 | Japan . |
| 1-177881 | 7/1989 | Japan . |
| 0315277 | 12/1989 | Japan ................................. 310/323 |
| 0315278 | 12/1989 | Japan ................................. 310/323 |

OTHER PUBLICATIONS

"Paper Sending Device Using Flat Flat Plate Piezoelectric Vibrator (I)", Osamu Ohnishi et al., Transaction of the Institute of Electronics, Information and Communication Engineers in the Spring Convention of 1988, A-224, p. 1-226.

"Paper Sending Device Using Flat Plate Piezoelectric Vibrator (II)", Osamu Myohga et al., Transaction of the Institute of Electronics, Information and Communication Engineers in the Spring Convention of 1988, A-225, p. 1-227.

*Primary Examiner*—Mark O. Budd
*Attorney, Agent, or Firm*—Burns, Doane, Swecker & Mathis

[57] ABSTRACT

An ultrasonic sheet feeder includes a convex shell, piezoelectric ceramic elements, a base, a roller, and a driving power source. The convex shell has a protruding middle portion. Each piezoelectric ceramic element has one end in contact with a corresponding one of the two ends of the convex shell. The base serves to fix the other end of each of the piezoelectric ceramic elements. The roller is arranged to oppose the protruding middle portion of the convex shell so as to urge a paper sheet against the convex shell when the paper sheet is loaded. The coefficient of friction of a contact portion of the roller with respect to the paper sheet is smaller than that of a contact portion of the convex shell with respect to the paper sheet. The driving power source applies AC voltages having a phase difference to the two piezoelectric ceramic elements. A low-profile ultrasonic motor used for the ultrasonic sheet feeder and methods of driving the motor and the sheet feeder are also disclosed.

18 Claims, 12 Drawing Sheets

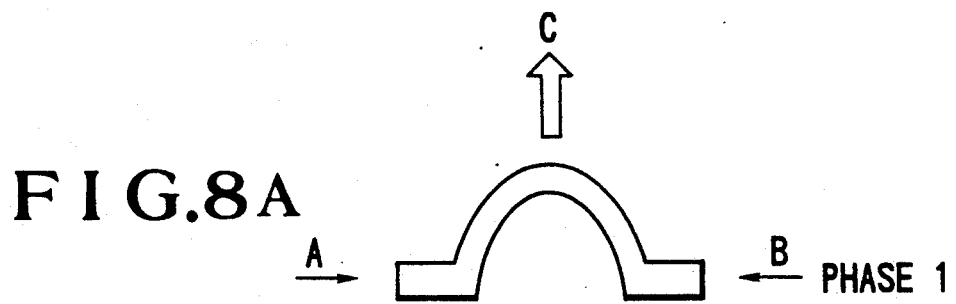
FIG. 8A — PHASE 1
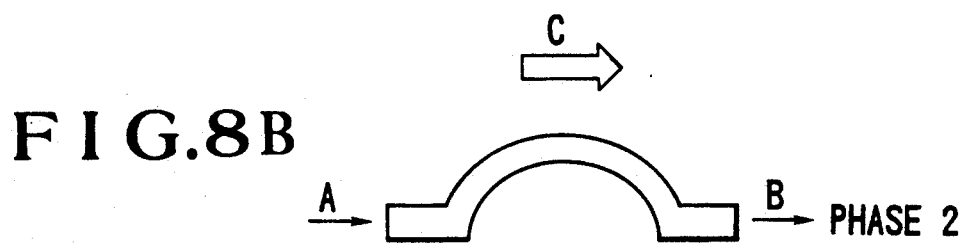
FIG. 8B — PHASE 2
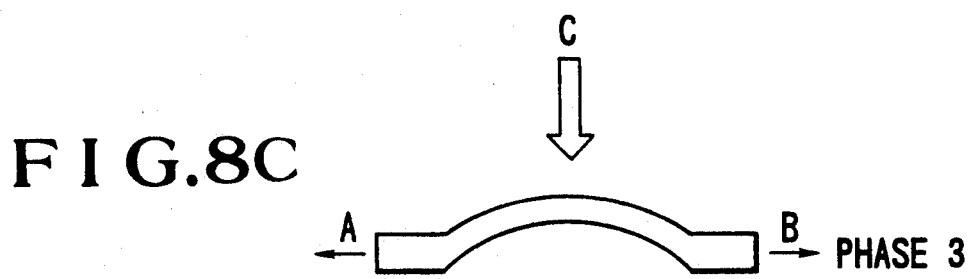
FIG. 8C — PHASE 3
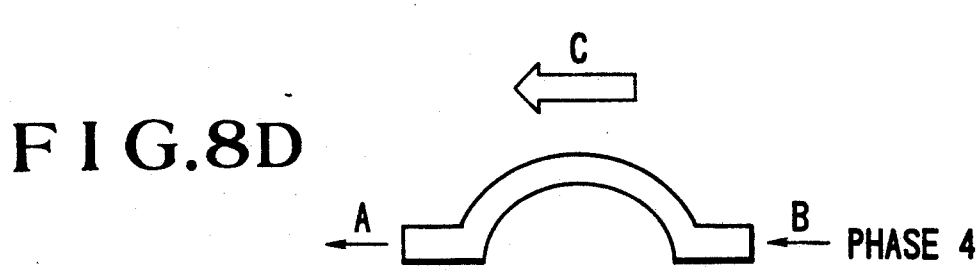
FIG. 8D — PHASE 4

ULTRASONIC SHEET FEEDER, LOW-PROFILE ULTRASONIC MOTOR, AND METHOD OF DRIVING THE SAME

BACKGROUND OF THE INVENTION

The present invention relates to a low-profile ultrasonic sheet feeder utilizing ultrasonic vibrations, a low-profile ultrasonic motor, and a method of driving the same, which are intended to be applied to office automation equipment, e.g., facsimile apparatuses and printers.

In order to realize low-profile sheet feeding mechanisms used for office automation equipment and the like, ultrasonic motors using flat vibrators have been enthusiastically studied.

An ultrasonic feeder using a vertical flexural multiple mode flat vibrator has already been proposed in Japanese Patent Application Nos. 62-126634 and 62-126636 (Japanese patent Application Laid-Open Nos. 63-290176 and 63-294270). In addition, the design, trial manufacture, and evaluation results about the ultrasonic sheet feeder using the flat vibrator have been reported in the Transactions of the Institute of Electronics, Information and Communication Engineers in the Spring Convention of 1988, "A-224" and "A-225".

Of these conventional devices, a structure of a vertical flexural multiple mode flat vibrator is shown in FIGS. 19(a) and 19(b). FIG. 19(a) is a plan view of the vibrator. FIG. 19(b) shows a front view of the vibrator and a circuit for driving the vibrator. Referring to FIGS. 19(a) and 19(b), reference numeral 100 denotes a rectangular metal plate; and 111, 112, and 113, piezoelectric ceramic plates. The piezoelectric ceramic plate 111 serves to mainly excite a vertical fundamental resonance mode. The piezoelectric ceramic plates 112 and 113 serve to mainly excite flexural vibrations. Reference numeral 120 denotes an oscillator; 121, a phase shifter; and 122 and 123, amplifiers.

FIGS. 20(a) and 20(b) show the vibration mode of this vertical flexural multiple piezoelectric vibrator. FIG. 20(a) is a plan view of the vibrator. FIG. 20(b) is a front view of the vibrator. The broken line in FIG. 20(b) indicates the vibration displacement distribution of vertical fundamental resonance. The broken lines in FIG. 20(a) indicate vibration nodes of the flexural vibration mode ($B_{2-2}$ mode). A resonance frequency $f_{B22}$ of the flexural vibration $B_{2-2}$ mode is dependent on a width $W_0$ and a plate thickness $T_0$ and is inversely proportional to the width $W_0$. In addition, a resonance frequency $f_{L1}$ of vertical vibrations is dependent on a length $L_0$ and is inversely proportional to the length $L_0$. Therefore, by properly setting the width $W_0$ and the length $L_0$, $f_{L1}=f_{B22}$ can be realized. Then, both the vertical vibration fundamental primary mode and the flexural vibration $B_{2-2}$ mode can be resonated for the first time.

By setting a phase difference of ±90° between vertical vibrations and flexural vibrations, a large-amplitude elliptic vibration can be produced near a point P or Q in FIG. 20. A phase difference can be easily set between vertical vibrations and flexural vibrations by causing the phase shifter 121 to set a phase difference between AC voltages respectively applied to the piezoelectric ceramic plate 111 and the piezoelectric ceramic plates 112 and 113.

FIG. 21 shows an ultrasonic sheet feeder using the vertical flexural double mode vibrator shown in FIG. 19. Referring to FIG. 21, reference numeral 114 denotes a plate consisting of a flexible material such as rubber; 115, a hard metal base; 116, a roller; and 117, a paper sheet. In addition, an arrow $F_0$ indicates a force which urges the roller 116 against the flat vibrator. Vibration displacement based on the flexural vibrations of the flat vibrator occurs in the Z-axis direction, whereas vibration displacement of the vertical vibrator occurs in the X-axis direction. If a paper sheet is placed on the flat vibrator, and the roller 116 is pressed on the sheet at the point P in FIG. 20, an elliptic vibration composed of vibration displacements in the X- and Z-axis directions is produced at the point P at which the roller 116 is in contact with the paper sheet. As a result, the paper sheet 117 can be moved in the positive or negative X-axis direction through a frictional force generated between the rectangular metal plate 100 of the flat vibrator and the paper sheet 117. Whether to move the paper sheet 117 in the positive or negative X-axis direction can be easily selected by properly setting the phase difference between voltages to be applied to the piezoelectric ceramic plate 111 and the piezoelectric ceramic plates 112 and 113.

The following problem, however, is posed in the ultrasonic sheet feeder using such a conventional vertical flexural double mode vibrator. If, for example, the sheet feeder uses a general vibrator having a thickness $T_0$ of 2 mm, a length $L_0$ of 70 mm, and a width $W_0$ of 15 mm, a large speed of about 55 mm/s can be relatively easily obtained as the moving speed of a paper sheet. However, only a thrust of 300 gf can be obtained at best with a contact force F of 1 kgf. Although, such a feeder is suitable for a light load, e.g., a card feeder, it is far from satisfactory as a sheet feeder for a facsimile apparatus requiring a high thrust (e.g., 1 kgf or more).

This is because if the contact force $F_0$ is increased to obtain a high thrust, flexural vibrations are suppressed due to the use of the flat vibrator. In addition, a silicone rubber sheet 114 such as the plate 111 is used so as not to suppress flexural vibrations. However, if the ultrasonic sheet feeder is realized with a resonance frequency of about 30 kHz, this silicone rubber sheet 114 is required to have a thickness of at least about 5 mm. That is, the total thickness of this sheet feeder including the roller 116 becomes 20 mm or more. Therefore, the silicone rubber sheet 114 interferes with the development of a low-profile sheet feeder.

In order to increase the feed speed, resonance driving must be performed while the vertical and flexural resonance frequencies of the double mode flat vibrator are set to coincide with each other. However, frequency adjustment for this operation is very complicated, resulting in difficulties in the manufacturing process.

SUMMARY OF THE INVENTION

It is an object of the present invention to provide a low-profile ultrasonic sheet feeder having a large thrust and high torque.

It is another object of the present invention to provide a low-profile ultrasonic motor having a large thrust and high torque.

According to an aspect of the present invention, there is provided an ultrasonic sheet feeder comprising a convex shell having a protruding middle portion, piezoelectric ceramic elements, each having one end in contact with a corresponding one of two ends of the convex shell, fixing means for fixing the other end of each of the piezoelectric ceramic elements, a press block, arranged to oppose the protruding middle portion of the convex shell, for urging a sheet-like member to be conveyed against the convex shell when the sheet-like member is loaded, the press block having a contact portion with respect to the sheet-like member, and the contact portion having a coefficient of friction smaller than that of a contact portion, of the convex shell, with respect to the sheet-like member, and a driving power source for applying AC voltages having a phase difference to the two piezoelectric ceramic elements.

According to another aspect of the present invention, there is provided a low-profile ultrasonic motor comprising a pair of resonators, each consisting of a relatively thin portion and a relatively thick portion formed on one end of the thin portion, piezoelectric ceramic elements, respectively mounted on the thin portions of the resonators, for producing vertical vibrations, a convex shell including a protruding middle portion and having two ends, each connected to the other end of each of the thin portions of the resonators, and a roller urged against the middle portion of the convex shell.

According to still another aspect of the present invention, there is provided a low-profile ultrasonic motor comprising a pair of resonators, each having two arm portions opposing each other, a bottom portion formed by connecting one end of one of the arm portions to one end of the other arm portion, and a U-shaped longitudinal section, a convex shell having a protruding middle portion and connected to the other end of each of the arm portions of the resonators, piezoelectric ceramic elements respectively mounted on the arm portions of the resonators, and a roller urged against the middle portion of the convex shell.

According to still another aspect of the present invention, there is provided a low-profile ultrasonic motor comprising a pair of resonators, each having two arm portions opposing each other, a bottom portion formed by connecting one end of one of the arm portions to one end of the other arm portion, and a U-shaped longitudinal section, a convex shell having a protruding middle portion and connected to the other end of each of the arm portions of the resonators, a support portion connected to the other end of the other arm portion of each of the resonators, piezoelectric ceramic elements respectively mounted on the arm portions of the resonators, and a roller urged against the middle portion of the convex shell.

According to still another aspect of the present invention, there is provided a low-profile ultrasonic motor comprising a pair of resonators, each having two arm portions opposing each other, a bottom portion formed by connecting one end of one of the arm portions to one end of the other arm portion, and a U-shaped cross section, a convex shell having a protruding middle portion and connected to the other end of each of the pair of arm portions of the resonators, piezoelectric ceramic elements having different polarization directions and respectively mounted on the arm portions of the resonators, and a roller urged against the middle portion of the convex shell.

According to the present invention, the piezoelectric ceramic elements are driven by AC voltages in a frequency band lower than a natural resonance frequency of the ultrasonic sheet feeder, and a phase difference of about 90° is set between mechanical vibration displacements output from the two piezoelectric ceramic elements to produce elliptical movement of the middle portion of the convex shell, thereby conveying the sheet-like member in a non-resonance mode.

In addition, according to the present invention, the piezoelectric ceramic elements are driven at a resonance frequency at which the convex shell is translated, and a phase difference of about 90° is set between mechanical vibration displacements output from the two piezoelectric ceramic elements to produce elliptical movement of the middle portion of the convex shell, thereby conveying the sheet-like member in a resonance mode.

Furthermore, according to the present invention, the piezoelectric ceramic elements are driven at a resonance frequency at which the convex shell is vibrated, and a phase difference of about 90° is set between mechanical vibration displacements output from the two piezoelectric ceramic elements to produce elliptical movement of the middle portion of the convex shell, thereby conveying the sheet-like member in a resonance mode.

In addition, according to the present invention, the convex shell is driven by using one of the two piezoelectric ceramic elements, thereby conveying the sheet-like member at a resonance frequency of a stator portion constituted by the two piezoelectric ceramic elements, the convex shell, and the base.

Moreover, according to the present invention, the piezoelectric ceramic elements are driven at a resonance frequency at which the convex shell is translated, and a phase difference of about 90° is set between vibration displacements output from the two piezoelectric ceramic elements to produce elliptical movement of the middle portion of the convex shell, thereby rotating the roller in a resonance mode.

BRIEF DESCRIPTION OF THE DRAWINGS

FIGS. 8(a) to 8(d) are views showing the movement of a convex shell portion in the embodiment in FIG. 6;

DESCRIPTION OF THE PREFERRED EMBODIMENTS

Figure 1A:
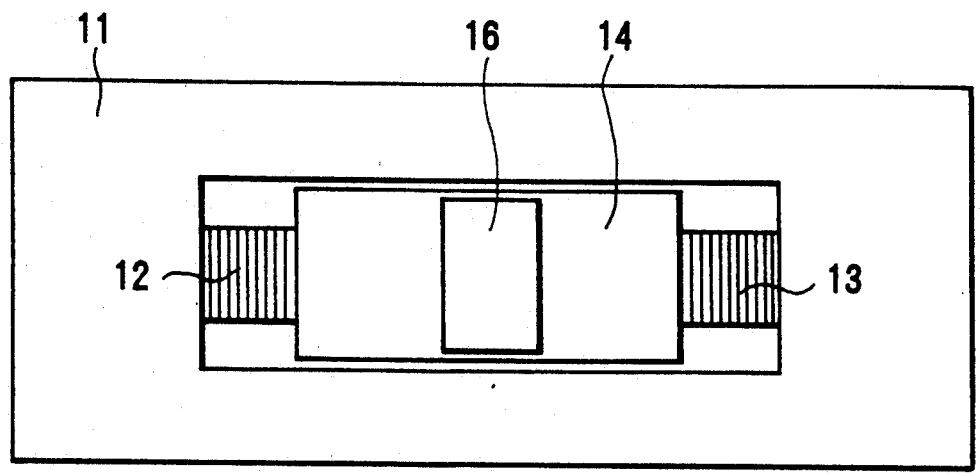
FIGS. 1(a) and 1(b) are a plan view and a sectional front view, respectively, showing the basic arrangement of an ultrasonic sheet feeder according to the first embodiment of the present invention.
Figure 1B:
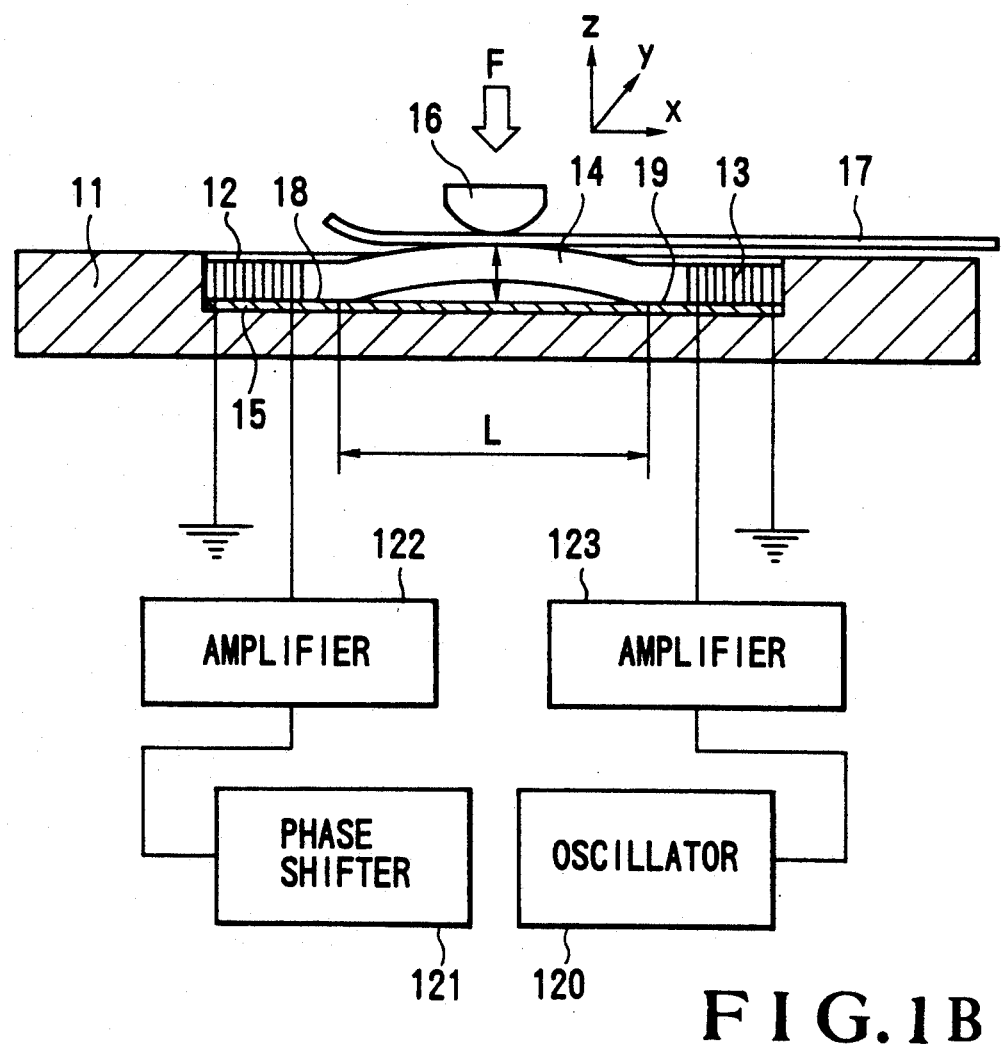

Embodiments of the present invention will be described in detail below. FIG. 1(a) is a plan view of the first embodiment of the present invention. FIG. 1(b) is a sectional front view of the embodiment.

FIGS. 1(a) and 1(b) show an ultrasonic sheet feeder of the present invention, in which the following components are arranged in a recess portion in the middle of a soft steel base 11: piezoelectric ceramic elements 12 and 13; a convex shell 14 consisting of precipitation hardening type stainless steel (17—17 pH); a wear-resistant sheet 15 consisting of an engineering plastic material having a small coefficient of dynamic friction and high wear resistance; a press block 16 coated with a thin engineering plastic film having a small coefficient of dynamic friction with respect to a paper sheet 17; and the paper sheet 17 used for a facsimile apparatus. Reference numerals 18 and 19 denote shell bottom portions at which the convex shell 14 is in contact with the wear-resistant sheet 15.

The convex shell 14 is curved in the longitudinal direction except for its two end portions, thus causing its middle portion to slightly protrude upward. The piezoelectric ceramic elements 12 and 13 respectively have laminated structures and are in contact with the two ends of the convex shell 14.

In this embodiment, a compressive force of 9 kgf is applied beforehand to each of the piezoelectric ceramic elements 12 and 13 by the convex shell 14 and the base 11. The convex shell has a length L of 25 mm, a thickness of 2 mm, and a height h of 2.5 mm. The press block 16 is urged against the convex shell 14 with a force F of 5 kgf so as not to be moved.

The ultrasonic sheet feeder having the above-described arrangement is driven by a driving power source constituted by an oscillator 120, a phase shifter 121, and amplifiers 122 and 123. This power source applies 3-kHz, 50-$V_{rms}$ high-frequency voltages having a phase difference of 90° to the piezoelectric ceramic elements 12 and 13, thus driving the elements in the non-resonance mode.

Consequently, the paper sheet 17 sandwiched between the convex shell 14 and the press block 16 was fed in one direction at a rate of 5 cm/sec. When the phase difference given by the phase shifter 121 was changed to be −90°, the paper sheet 17 was fed in the opposite direction at the same rate. When thrust characteristics relative to the feed speed were measured, a maximum thrust of 1 kgf was obtained.

Figure 2A:
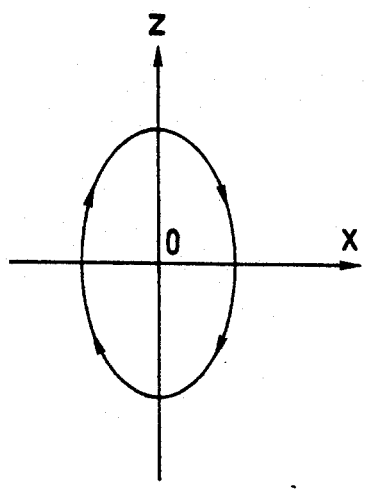
FIGS. 2(a) and 2(b) are graphs showing traces of vibration of a convex shell portion in the first embodiment in FIGS. 1(a) and 1(b)
Figure 2B:
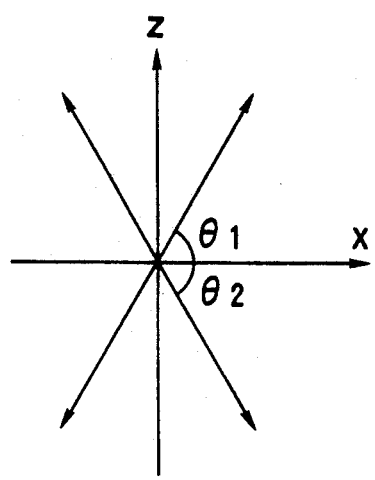

This ultrasonic sheet feeder can move the paper sheet 17 with a high thrust by causing elliptical vibration at the middle portion of the convex shell in contact with the press block 16, as indicated by the X-, Z-coordinate system in FIG. 2(a), or causing linear vibration (generally called woodpecker type vibration) at an inclination angle ($\theta_1$ or $\theta_2$) with respect to the X-axis, as shown in FIG. 2(b).

The elliptical vibration shown in FIG. 2(a) can be caused by driving the piezoelectric ceramic elements 12 and 13 in the non-resonance mode in a frequency band lower than the natural resonance frequency of the ultrasonic sheet feeder so as to set a phase difference of 90° between the output displacements from the elements 12 and 13.

In addition, the elliptical vibration shown in FIG. 2(a) can be caused by driving the piezoelectric ceramic elements 12 and 13 at a resonance frequency $f_1$ at which the convex shell 14 is translated in the X-axis direction or at a resonance frequency $f_2$ at which the convex shell 14 is vibrated in the Z-axis direction, and setting a phase difference of 90° between the mechanical vibration displacements output from the piezoelectric ceramic elements 12 and 13.

The linear vibration shown in FIG. 2(b) is easily caused by driving the convex shell 14 using one of the piezoelectric ceramic elements 12 and 13.

30-khz, 50-$V_{rms}$ high-frequency voltages were applied to the piezoelectric ceramic elements 12 and 13 with a given phase difference to produce the translation vibration of the convex shell 14 in the resonance mode. It was found upon adjustment that the optimal phase difference was 85°. As a result, the paper sheet 17 sandwiched between the convex shell 14 and the press block 16 was fed in one direction at a speed of 20 cm/sec. When this phase difference was changed to −95°, the paper sheet 17 was fed in the opposite direction at the same speed. When thrust characteristics relative to the feed speed were measured, a maximum thrust of 1.5 kgf was obtained.

In addition, 38-kHz, 50 $V_{rms}$ high-frequency voltages were applied to the piezoelectric ceramic elements 12 and 13 with a given phase difference to produce the flexural vibration of the convex shell 14 in the resonance mode. It was found upon adjustment that the optimal phase difference was 107°. As a result, the paper sheet 17 sandwiched between the convex shell 14 and the press block 16 was fed in one direction at a speed of 6.5 cm/sec. When this phase difference was changed to −73°, the paper sheet 17 was fed in the opposite direction at the same speed. When thrust characteristic relative to the feed speed were measured, a maximum thrust of 1.1 kgf was obtained.

When a 30-kHz, 50 $V_{rms}$ high-frequency voltage was applied to only the piezoelectric ceramic element 12 to drive the convex shell 14 in the resonance mode, the paper sheet 17 was fed in one direction at a speed of 10 cm/sec. When the same high-frequency voltage was applied to only the piezoelectric ceramic element 13 to drive the convex shell 14 in the resonance mode, the paper sheet 17 was fed in the opposite direction at the same speed. At this time, the maximum thrust was 1.2 kgf.

A method of driving the ultrasonic sheet feeder of the present invention will be described below with reference to FIG. 3.

Figure 3:
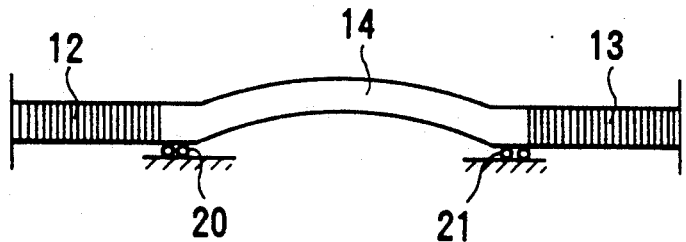
FIG. 3 is a view showing a physical model of a main part of the ultrasonic sheet feeder of the first embodiment in FIGS. 1(a) and 1(b)

Referring to FIG. 3, reference numerals 20 and 21 denote slide members. As described above, the two methods, i.e., the non-resonance driving method and the resonance driving methods, are used as driving methods of causing the convex shell 14 to move elliptically. As shown in FIG. 3, it is required that the convex shell be driven by using both the piezoelectric ceramic elements 12 and 13. In this case, a vibration system constituted by the piezoelectric ceramic elements 12 and 13 and the convex shell 14 has two intrinsic vibration modes, i.e., a mode (asymmetrical mode) in which the convex shell 14 is translated; and a mode (symmetrical mode) in which the convex shell 14 is vibrated.

Figure 4A:
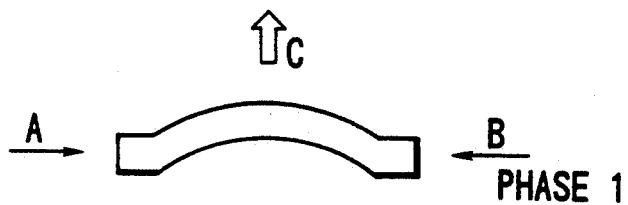
FIGS. 4(a) to 4(d) are views showing the movement of the convex shell in the first embodiment in FIGS. 1(a) and 1(b)
Figure 4B:
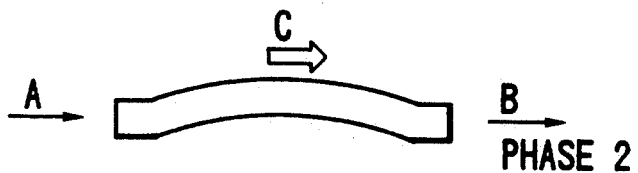
Figure 4C:
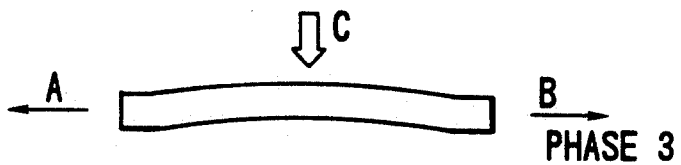
Figure 4D:
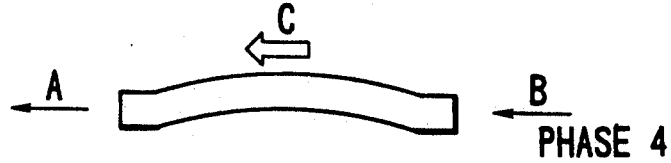

FIGS. 4(a) to 4(d) show the movement of the convex shell 14. Referring to FIGS. 4(a) to 4(d), displacements caused by the piezoelectric ceramic elements 12 and 13 are respectively represented by A and B, and a displacement at the middle portion of the convex shell 14, caused by the displacements A and B, is represented by C. FIGS. 4(b) and 4(d) correspond to the asymmetrical mode; and FIGS. 4(a) and 4(c), the symmetrical mode. Owing to the flexural stiffness of the convex shell 14, the resonance frequency $f_2$ in the symmetrical mode is normally 1.2 to 1.4 times higher than the resonance frequency $f_1$ in the asymmetrical mode. Note that in order to set the frequency $f_2$ to be close to the frequency $f_1$, the flexural stiffness of the convex shell 14 must be sufficiently reduced. Such setting is not practicable.

Provided that FIGS. 4(a) to 4(d) show one cycle, by sequentially driving the piezoelectric ceramic elements 12 and 13, the middle portion of the convex shell 14 can be caused to move elliptically.

The driving method of causing elliptical movement in the non-resonance mode will be described first.

Figure 5A:
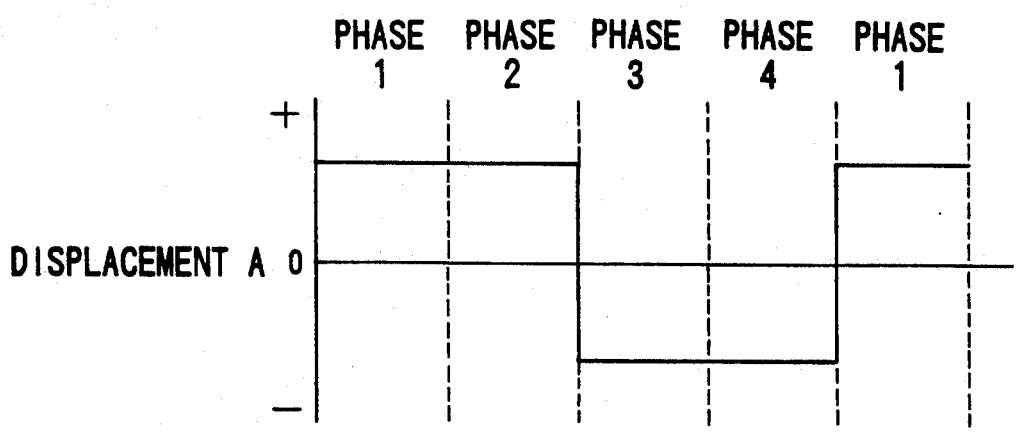
FIGS. 5(a) and 5(b) are charts, each showing the relationship between the output displacement of a piezoelectric ceramic element and the phase of the movement of the convex shell in a non-resonance driving method according to the first embodiment.
Figure 5B:
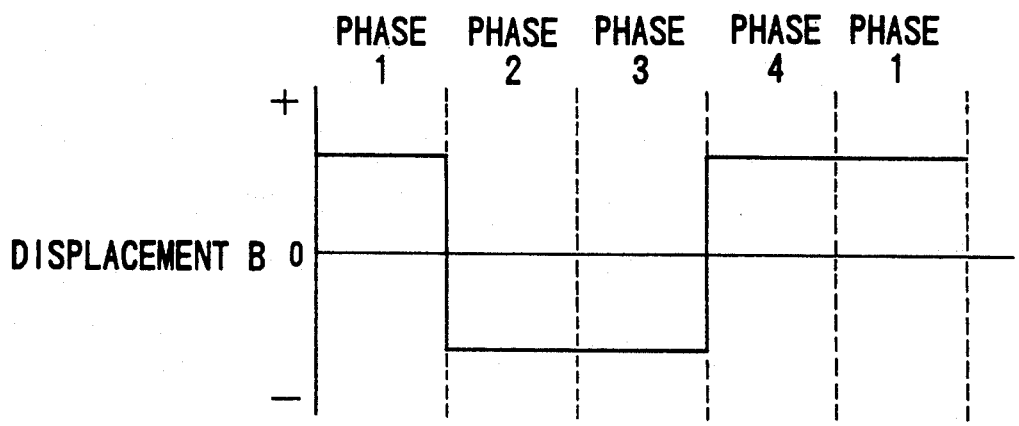

FIGS. 5(a) and 5(b) respectively show the relationships between the phase of the movement of the convex shell 14 (FIG. 4) and the output displacements of the piezoelectric ceramic elements 12 and 13. Assume that when the piezoelectric ceramic elements 12 and 13 expand, the corresponding output displacements become positive values, and when the elements 12 and 13 contract, the corresponding output displacements become negative values. Therefore, a displacement in the right direction is positive for the piezoelectric ceramic element 12, whereas a displacement in the left direction is positive for the piezoelectric ceramic element 13.

A non-resonance pulse driving operation can be easily performed by giving the displacements shown in FIGS. 5(a) and 5(b) to the piezoelectric ceramic elements 12 and 13 at a pulse repeating frequency sufficiently lower than the resonance frequency $f_1$ in the asymmetrical mode. In addition, a non-resonance sine wave driving operation can be performed by setting a phase difference of 90° or −90° between the output displacements of the piezoelectric ceramic elements 12 and 13. When a high feed speed is not required, the non-resonance driving method is the most advantageous driving method in terms of ease in control of the feed speed.

The driving method of causing the shell middle portion to move elliptically by utilizing resonance will be described next.

In this case, the resonance mode can be realized by either the symmetrical mode or the asymmetrical mode. However, in comparison with the driving method using symmetrical mode resonance, the driving method using the asymmetrical mode resonance is advantageous in that a sufficient feed speed can be obtained. That is, if the asymmetrical mode resonance is used, the displacement amount of the convex shell 14 in the X-axis direction can be increased.

A sufficient feed speed can be achieved by setting a phase difference of 90° or −90° between the displacements of the piezoelectric ceramic elements 12 and 13, and driving them at the resonance frequency $f_1$ in the asymmetrical mode.

The driving method using symmetrical mode resonance is advantageous in that a large displacement of the convex shell 14 in the Z-axis direction can be obtained. Therefore, a contact or non-contact state between the paper sheet and the shell can be reliably and stable attained, and the sheet can be fed in a state close to that of a static frictional force. For this reason, wear between the convex shell 14 and the press block 16 is small.

In this case, the output displacements from the piezoelectric ceramic elements 12 and 13 are small since the elements 12 and 13 are in the non-resonance mode. However, when low-speed, stable paper feed is required, this method is extremely effective.

The method of driving a paper sheet by causing the middle portion of the convex shell 14 to linearly move in a direction at the angle $\theta_1$ or $\theta_2$ with respect to the X-axis, as shown in FIG. 2(b), can be realized as follows.

Referring to FIG. 3, when the convex shell 14 is driven by applying a voltage to only the piezoelectric ceramic element 12 without applying a voltage to the piezoelectric ceramic element 13, linear movement of the middle portion of the convex shell 14 can be produced in the direction at the angle $\theta_1$ with respect to the X-axis in FIG. 2.

As shown in FIG. 1(b), when the paper sheet 17 and the press block 16 are arranged on the convex shell 14, and the contact force F is applied thereto, the paper sheet 17 is moved in the positive X-axis direction through the frictional force.

Similarly, when a voltage is applied to only the piezoelectric ceramic element 13, the paper sheet can be moved in the negative X-axis direction. According to this woodpecker type driving method, a paper feed operation can be performed either in the resonance mode or in the non-resonance mode. Even if a resonance driving operation is to be performed, cumbersome frequency adjustment to match the two resonance frequencies for vertical and flexural vibrations with each other is not required, unlike the conventional vertical flexural double mode flat vibrator.

When a metal roller having a diameter of 5 mm was used in place of the press block 16 as a component of the ultrasonic sheet feeder in each driving method described above, paper feed operations could be performed in the same manner as described above.

As is apparent from the above description, the ultrasonic sheet feeder based on the present invention can achieve a great increase in thrust.

In this sheet feeder, the piezoelectric ceramic elements 12 and 13 are arranged at the two ends of the convex shell 14 to be integrally formed therewith, and the two ends of the piezoelectric ceramic elements 12 and 13 are fixed to the base 11 having high rigidity. In this arrangement, since the convex shell 14 has an arch type structure, it achieves much larger stiffness with respect to the large contact force F than the conventional flexural flat plate. Although the convex shell 14 having two ends fixed is deformed in a direction to increase the radius of curvature upon reception of the large contact force F, the deformation is small as compared with the flat plate.

In addition, a force several times larger than the contact force F applied to the convex shell 14 is applied, as a compressive force, to the piezoelectric ceramic elements 12 and 13. However, since the strength of each piezoelectric ceramic element against a compressive force is several times larger than that against a pulling force, and the stiffness of each element against compressive force is generally large, deformation of each element is also small.

Even if the high contact force F is applied to the convex shell 14, the resultant deformation amount of the ultrasonic sheet feeder of the present invention is small, thus achieving an increase in rigidity.

In addition, in the ultrasonic sheet feeder of the present invention, an increase in the contact force F does not significantly directly interfere with vibrations of the piezoelectric ceramic elements 12 and 13. When the contact force F is applied to an upper portion of the convex shell 14, the shell bottom portions 18 and 19 receive a vertical reaction force F' (having the same magnitude as that of the contact force F and acting in the opposite direction thereof) from the wear-resistant sheet 15. If, therefore, a material for the wear-resistant sheet 15 and a solid lubricant are selected to set a small coefficient $\mu'$ of dynamic friction between the sheet 15 and the shell bottom portions 18 and 19, a dynamic frictional force $\mu'F$ interfering with the vibrating movement of each piezoelectric ceramic element can be suppressed to a small value.

Even if, therefore, the large contact force F is applied to the convex shell 14, vibration displacements output from the piezoelectric ceramic elements 12 and 13 are not significantly suppressed. In addition, since the convex shell 14 is used, a displacement 5 to 20 times larger than the output displacement of each of the piezoelectric ceramic elements 12 and 13 is caused at the shell middle portion, and large vibrations can be excited in the Z-axis direction, thereby realizing a smooth feed operation regardless of the type of paper sheet.

The displacement magnification (the displacement of the shell middle portion in the Z-axis direction with respect to the displacement of an actuator in the X-axis direction) of the convex shell 14 is increased with a decrease in a ratio h/L of the height h of the shell to the length L of the shell. Therefore, the displacement magnification is increased as the radius of curvature of the convex shell 14 is increased.

A low-profile ultrasonic motor according to an embodiment of the present invention will be described below.

Figure 6:
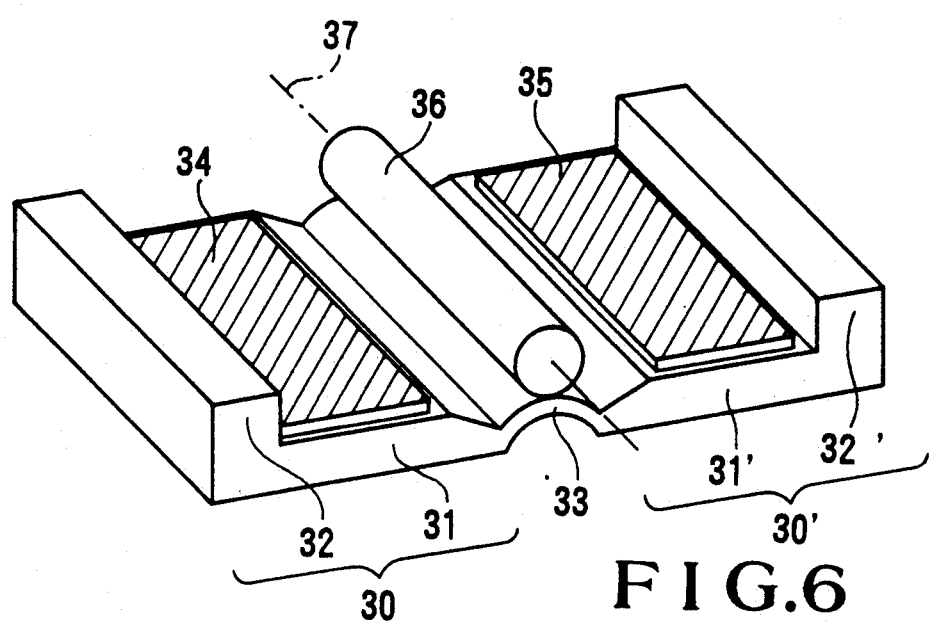
FIG. 6 is a perspective view showing the basic arrangement of a low-profile ultrasonic motor of an embodiment of the present invention.

FIG. 6 is a perspective view of this ultrasonic motor.

Resonators 30 and 30' are constituted by thin portions 31 and 31', thick portions 32 and 32' on the two sides of the thin portions 31 and 31', and piezoelectric ceramic elements 34 and 35 respectively bonded to the thin portions 31 and 31'. The thin and thick portions are composed of stainless steel. Furthermore, a convex shell 33 is formed between the resonators 30 and 30' to constitute a stator.

A brass roller 36 is urged against the convex shell 33 with a force of, e.g., 6 kgf to constitute an ultrasonic motor.

The piezoelectric ceramic elements 34 and 35 are respectively bonded to the thin portions 31 and 31' with an epoxy adhesive agent so as to have the same polarization direction.

In this embodiment, in the low-profile ultrasonic motor having the above-described arrangement, the length of the resonator portion is 25 mm; the length of the convex shell, 6 mm (radius of curvature: 4 mm); the total length of the stator, 60 mm; the height, 5 mm; and the roller diameter, 8 mm.

75.23-kHz, $V_{rms}$ high-frequency voltages were applied to the piezoelectric ceramic elements 34 and 35 with a phase difference of 90° to drive them in the resonance mode. As a result, the roller 36 was rotated in one direction at a rotational speed of 255 rpm. When the phase difference was changed to −90°, the roller was rotated in the opposite direction at the same rotational speed. When roller rotational speed/torque characteristics were measured, a starting torque of 1.0 kgf·cm was obtained. With such a simple structure, a high thrust can be obtained.

An operation of the embodiment will be described in detail below with reference to FIGS. 7(a) to 9(b).

Figure 7A:
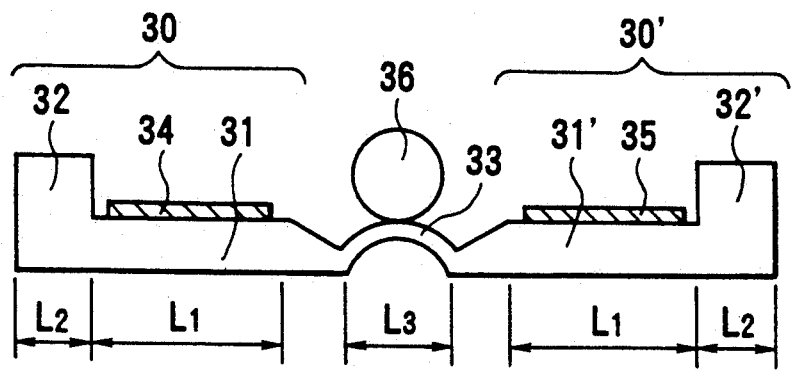
FIGS. 7(a) to 7(d) are a front view, a plan view, and graphs showing the vibration displacement distributions of the embodiment in FIG. 6, respectively.

As shown in FIG. 7(a), the stepped asymmetrical λ/2 vertical resonators 30 and 30' are arranged on the two sides of the convex shell 33, and the piezoelectric ceramic elements 34 and 35 for exciting vertical vibrations are respectively bonded to the thin portions 31 and 31', thus constituting the stator.

Similar to the embodiment shown in FIGS. 1(a) and 1(b), with the convex shell 33 having such a structure, the stiffness against a contact force F from the roller can be greatly increased as compared with the conventional flexural flat vibrator. If, for example, the convex shell 33 has an arcuated shape, as shown in FIG. 7(a), and a contact force of 10 kgf is applied to the convex shell 33 consisting of stainless steel and having a shell thickness of 1 mm, a radius of curvature of 4 mm, and a height of 4 mm, the convex shell is deformed in a direction to increase the curvature radius of the shell. However, the deformation amount is as small as 1 μm or less. A contact force is applied to the convex shell 33 by using the roller 36. In this arrangement, if the contact force is F and the coefficient of static friction between the roller 36 and the convex shell 33 is $\mu$, the static frictional force is represented by $\mu F$.

If this ultrasonic motor is used for a sheet feeder, since a thrust for a paper sheet sandwiched between the roller 36 and the shell 33 is increased with an increase in the static frictional force $\mu F$, the sheet feeder using the convex shell 33 is suitably used as a large-thrust sheet feeder.

Furthermore, in this embodiment, since vibration nodes exist inside the vertical resonators 30 and 30', a high mechanical quality coefficient $Q_m$ can be obtained with less vibration loss. One of the reasons why the thin portions 31 and 31' of the vertical vibrators 30 and 30' are thinner than the thick portions 32 and 32' is that large vibrations can be caused at the shell portion. The other reason is that a decrease in resonance frequency can be achieved.

More specifically, the resonance frequency can be minimized when a length ratio $L_2/L_1$ is about 0.25 to 0.3 for the same resonator length (a+b). As is known, a decrease in resonance frequency is advantageous from the view point that a large vibration amplitude can be set.

Figure 7B:
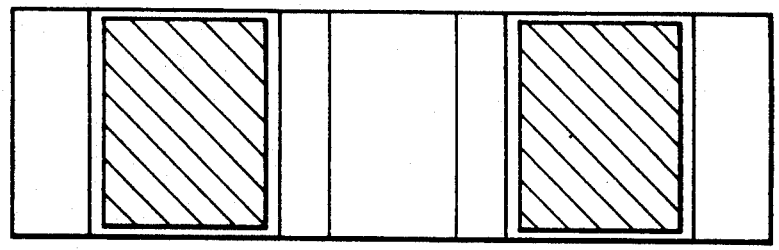
Figure 7C:
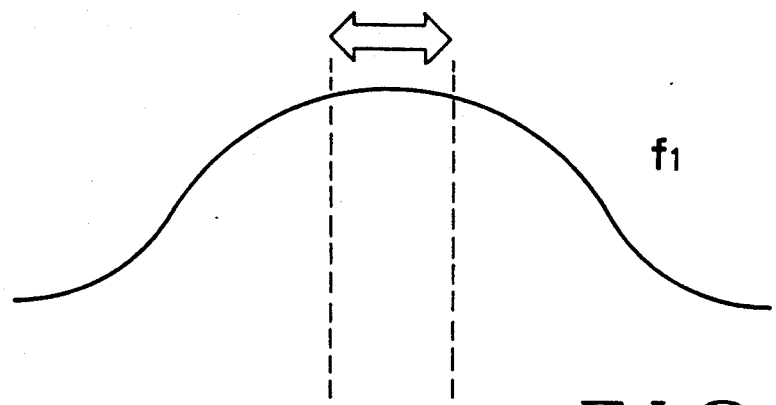
Figure 7D:
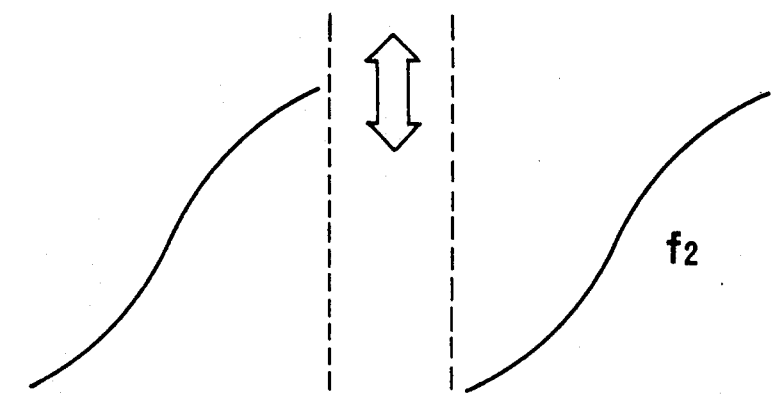

FIG. 7(a) is a front view of the ultrasonic motor. FIG. 7(b) is a plan view of the motor. This motor uses two resonance modes, i.e., inphase and opposite-phase modes. FIGS. 7(c) and 7(d) show the vibration displacement distributions of the resonator portion. FIG. 7(c) shows the opposite-phase mode, in which while one of two resonators expands, the other resonator contracts, thus moving the shell in the horizontal direction with almost no deformation of the shell.

FIG. 7(d) shows the inphase mode, in which the two resonators simultaneously expand or contract to move the shell in the vertical direction. Referring to FIGS. 7(a) and 7(b), thick arrows indicate the directions of the movement of the shell, and reference symbols $f_1$ and $f_2$ denote the resonance frequencies for the opposite-phase mode and the inphase mode. The frequencies $f_1$ and $f_2$ have a relation of $f_1 < f_2$. If the rigidity of the shell is increased, the difference between the frequencies $f_1$ and $f_2$ is increased. In this case, it is difficult to perform resonance driving of the shell in both the inphase and opposite-phase modes. It has been empirically confirmed, however, that if a shell having proper rigidity is used, and $(f_1-f_2)/(f_1 \cdot f_2)^{\frac{1}{2}}$ is 7% or less, resonance driving can be performed. That is, if the resonators 30 and 30' are driven with a phase difference of 90° under the contact force of the roller, the difference between the $f_1$ and $f_2$ modes is reduced, and the degenerate two modes can be realized at the same frequency.

A driving method of producing elliptical vibrations at the shell middle portion by resonance driving will be described below.

FIGS. 8(a) to 8(d) show the movement of the shell, in which displacements generated by the resonators 30 and 30' are respectively represented by A and B, and a displacement caused at the shell middle portion by the displacements A and B is represented by C. This operation is almost the same as that described with reference to FIGS. 4(a) to 4(d).

Figure 9A:
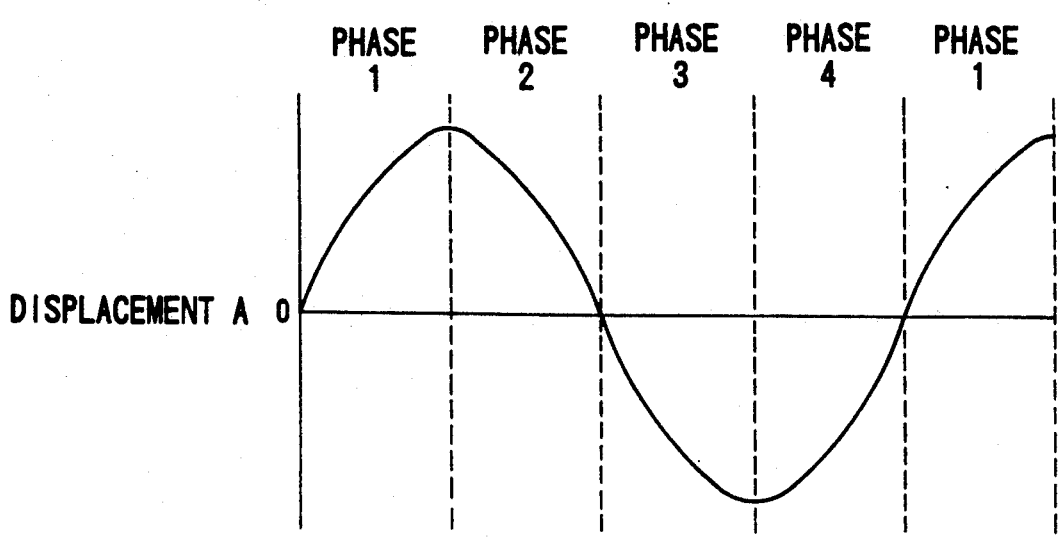
FIGS. 9(a) and 9(b) are graphs, each showing the relationship between the output displacement of a piezoelectric ceramic element and the phase of the movement of the convex shell in a non-resonance driving method according to the embodiment in FIG. 6.
Figure 9B:
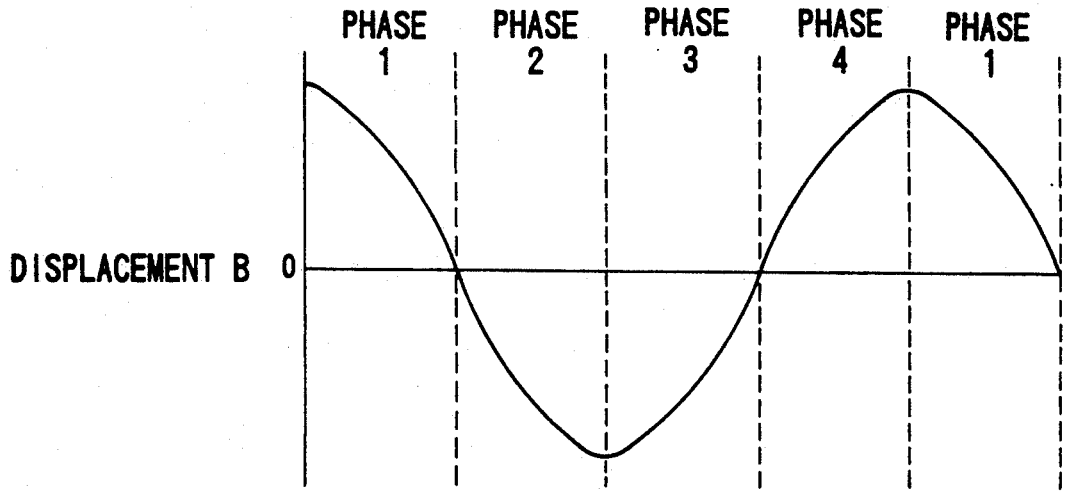

FIGS. 9(a) and 9(b) show the relationships between the phase of the movement of the shell and the output displacements of the resonators 30 and 30'. Assume that when the resonators 30 and 30' expand, the corresponding output displacements become positive values, and when they contract, the corresponding output displacements become negative values.

In the case shown in FIGS. 8(a) to 8(d), although the roller 36 is rotated counterclockwise, it can be rotated clockwise by advancing the phase of the resonator 31 by 180°.

Figure 10A:
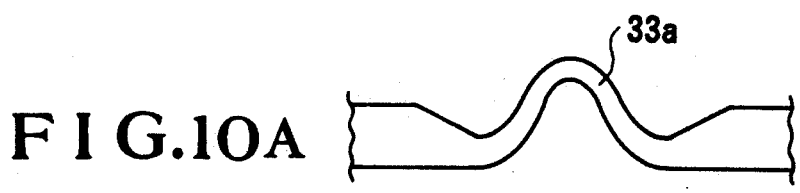
FIGS. 10(a) and 10(b) are front views respectively showing modifications of the convex shell in the embodiment in FIG. 6.
Figure 10B:
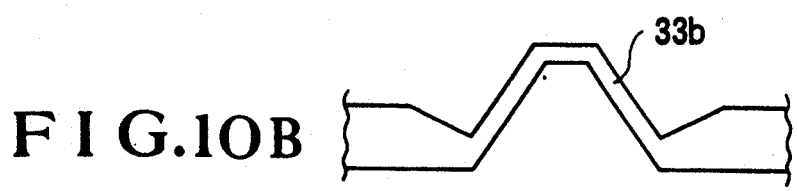

In addition to the convex shell 33 having the shape shown in FIG. 7(a), a convex shell 33a having a shape of a sine wave in FIG. 10(a) and a convex shell 33b having a trapezoidal shape in FIG. 10(b) may be used. With the convex shells having such shapes, the same function as that of the embodiment shown in FIG. 7(a) can be obtained.

A low-profile ultrasonic motor according to another embodiment of the present invention will be described next.

Figure 11A:
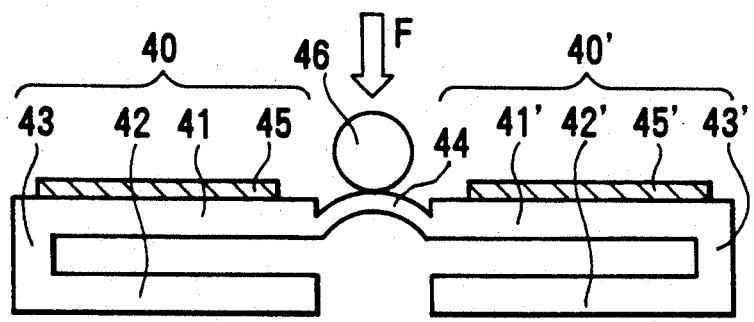
FIGS. 11(a) and 11(b) are a front view and a plan view, respectively, showing the basic arrangement of a low-profile ultrasonic motor according to another embodiment of the present invention.
Figure 11B:
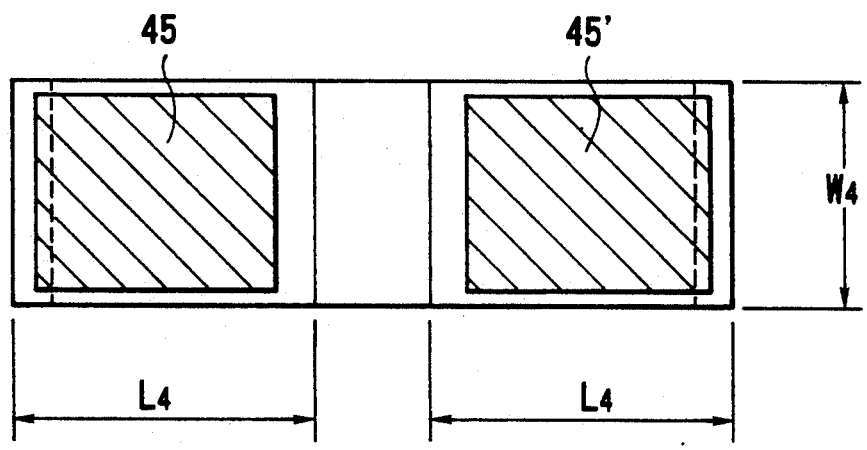

In the low-profile ultrasonic motor of this embodiment shown in FIGS. 11(a) and 11(b), a stator is constituted by U-shaped resonators 40 and 40', each consisting of stainless steel, and a convex shell 44 integrally formed therewith. The resonators 40 and 40' are respectively constituted by upper arm portions 41 and 41', lower arm portions 42 and 42', and bottom portions 43 and 43'. Piezoelectric ceramic elements 45 and 45' are respectively bonded to the upper arm portions 41 and 41' with an epoxy adhesive agent so as to have the same polarization direction. A brass roller 46 is urged against the convex shell 44 with a force of 6 kgf. The dimensions of the low-profile ultrasonic motor of this embodiment with such an arrangement are: the length of the resonator portion is 25 mm; the arm thickness of the resonator portion, 2 mm; the slit width, 1 mm; the length of the convex shell portion, 6 mm (radius of curvature: 4 mm); the total length of the stator, 60 mm; the height, 8 mm; and the diameter of the roller, 8 mm.

In the low-profile ultrasonic motor having the above-described arrangement, 47.59-kHz, 50-$V_{rms}$ high-frequency voltages were applied to the piezoelectric ceramic elements 45 and 45' with a phase difference of 90° to drive them in the resonance mode. As a result, the roller 46 was rotated in one direction at a rotational speed of 260 rpm. When the phase difference was changed to $-90°$ C., the roller 46 was rotated in the opposite direction at the same rotational speed. When torque characteristics relative to the rotational speed of the roller 46 were measured, a starting torque of 1.0 kgf·cm was obtained.

In this low-profile ultrasonic motor, vibration nodes exist inside the bottom portions 43 and 43' in a resonance driving operation, and $\lambda/4$ waves respectively appear on the upper arms 41 and 41' and the lower arms 42 and 42'. Therefore, the Q value is high (small mechanical loss), and a reduction in size in the longitudinal direction (X-axis direction) can be achieved. A length $L_4$ shown in FIG. 11(b) substantially corresponds to a $\frac{1}{4}$ wavelength.

Figure 12A:
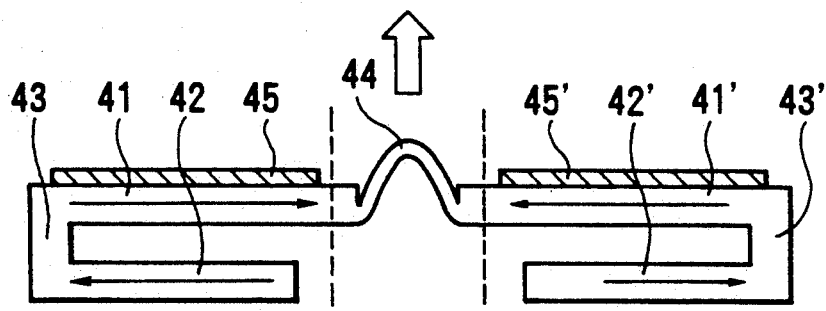
FIGS. 12(a) and 12(b) are views showing the movement of a resonator portion in the embodiment in FIGS. 11(a) and 11(b)
Figure 12B:
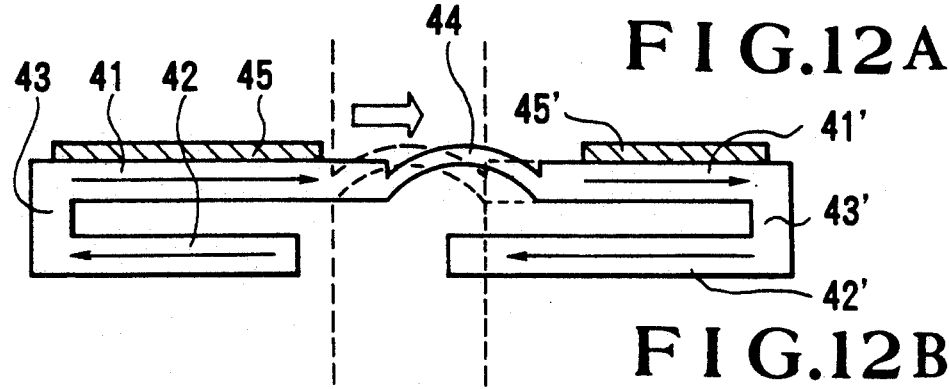

Similar to the embodiment shown in FIGS. 7(a) to 7(d), this low-profile ultrasonic motor has two intrinsic vibration modes, i.e., inphase and opposite-phase modes. FIGS. 12(a) and 12(b) respectively show the vibration displacement directions of the resonator portion. FIG. 12(a) shows the inphase mode. FIG. 12(b) shows the opposite-phase mode. The broken lines in FIGS. 12(a) and 12(b) indicate the positions of the resonator portion when it is not vibrated. The inphase mode shown in FIG. 12(a) is a vibration mode in which the shell is deformed to expand or contract, so that the shell middle portion is displaced in the vertical direction. The opposite-phase mode shown in FIG. 12(b) is a vibration mode in which the shell is translated while it is scarcely deformed. The thick arrows in FIGS. 12(a) and 12(b) indicate the directions of the movement of the shell, whereas the arrows in the resonators indicate the directions of the movement of the arms.

In the inphase mode, the shell serves as a stiffness component because it is deformed. In the opposite-phase mode, the shell serves as a mass because it is translated with almost no deformation. For this reason, in general, the resonance frequency $f_2$ for the inphase mode is slightly higher than the resonance frequency $f_1$ for the opposite-phase mode. If the rigidity of the shell is increased, the difference between the frequencies $f_1$ and $f_2$ is increased. In this case, it is difficult to perform resonance driving of the shell both in the inphase and opposite-phase modes. However, it has been empirically confirmed that if a shell having proper rigidity is used, and $(f_2-f_1)/(f_1 \cdot f_2)^{\frac{1}{2}}$ is 7% or less, resonance driving can be performed.

That is, when the resonators 40 and 40' are driven with a phase difference of 90° under the contact force of the roller, the difference between the frequencies $f_1$ and $f_2$ is reduced, and the degenerate two modes can be realized at the same frequency.

A driving method of producing elliptical vibrations at the shell middle portion by resonance driving is the same as that in the embodiment shown in FIGS. 7(a) to 7(d) described with reference to FIGS. 8(a) to 8(d).

Figure 13:
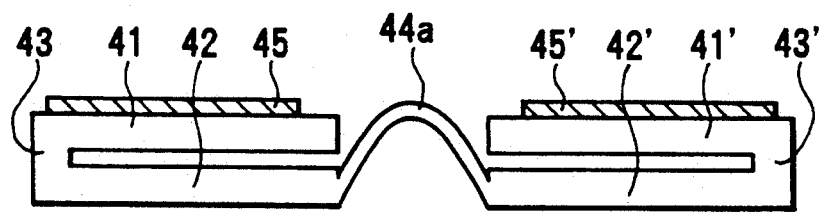
FIG. 13 is a front view showing the basic arrangement of low-profile ultrasonic motor according to another embodiment of the present invention.

Note that in an ultrasonic motor having the stator structure shown in FIG. 13, almost the same result as that of the embodiment in FIGS. 11(a) and 11(b) was obtained. In this embodiment, a convex shell 44a protrudes upward from the lower arms of U-shaped resonators. This ultrasonic motor is more advantageous than the motor having the structure shown in FIG. 11(a) in terms of a reduction in profile.

Note that the convex shells 44 and 44a may have the shapes shown in FIGS. 10(a) and 10(b).

In the embodiment shown in FIGS. 11(a) and 11(b), if the stainless steel convex shell has an arcuated shape, a shell thickness of 1 mm, a curvature radium of 4 mm, and a width is 20 mm, and a contact force of 10 kgf is applied to the convex shell, the shell is deformed in a direction to increase the radius of curvature. According to an experiment, however, the deformation amount is as small as 1 μm or less. Therefore, a high thrust can be obtained, similar to the above-described embodiments.

A low-profile ultrasonic motor according to still another embodiment of the present invention will be described below.

Figure 14A:
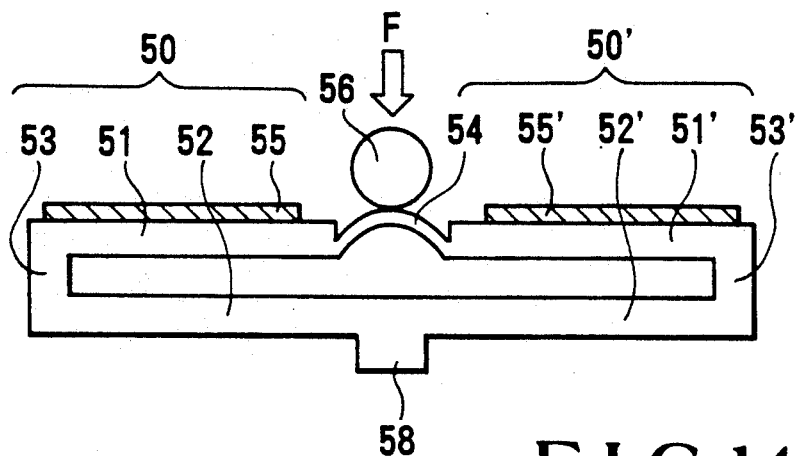
FIGS. 14(a) and 14(b) are a front view and a plan view showing the basic arrangement of a low-profile ultrasonic motor according to still another embodiment of the present invention.
Figure 14B:
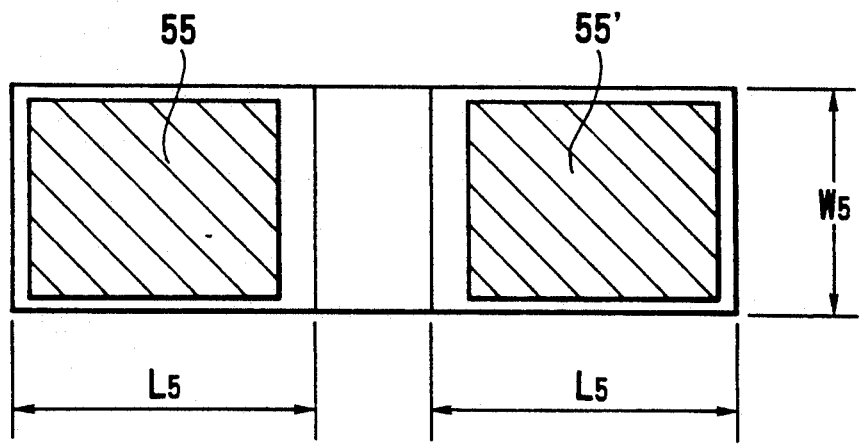

In the low-profile ultrasonic motor shown in FIGS. 14(a) and 14(b), a stator is constituted by substantially U-shaped resonators 50 and 50', each consisting of stainless steel, and a convex shell 54 integrally formed therewith. The resonators 50 and 50' are respectively constituted by upper arm portions 51 and 51', lower arm portions 52 and 52', and bottom portions 53 and 53'. Piezoelectric ceramic elements 55 an 55' are respectively bonded to the upper arm portions 51 and 51' with an epoxy adhesive agent to have the same polarization direction. A brass roller 56 is urged against the convex shell 54 with a contact force of, e.g., 6 kgf. Similar to the embodiment shown in FIGS. 11(a) and 11(b), the dimensions of the low-profile ultrasonic motor with such an arrangement are: the length of the resonator portion is 25 mm; the arm thickness of the resonator portion, 2 mm; the slit width, 1 mm; the length of the convex shell portion, 6 mm (radius of curvature: 4 mm); the total length of the stator, 60 mm; the height, 8 mm; and the diameter of the roller, 8 mm.

In the low-profile ultrasonic motor having the above-described arrangement, 56.23-kHz, 50-$V_{rms}$ high-frequency voltages were applied to the piezoelectric ceramic elements 55 and 55' with a phase difference of 90° to drive them in the resonance mode. As a result, the roller 56 was rotated in one direction at a rotational speed of 290 rpm. When the phase difference was changed to -90°, the roller 56 was rotated in the opposite direction at the same rotational speed. When torque characteristics relative to the rotational speed of the roller 56 were measured, a starting torque of 1.0 kgf·cm was obtained.

In this low-profile ultrasonic motor, a vibration node exists almost in the middle of each of the upper arm portions 51 and 51' so that $3\lambda/8$ waves respectively appear on the upper arm portions 51 and 51' and the lower arm portions 52 and 52', and a $3\lambda/4$ wave appears on the overall arm portions including the upper and lower arm portions. Therefore, the Q value is high in the resonance mode, and a reduction in size in the longitudinal direction (X-axis direction) can be achieved. A length $L_5$ in FIG. 14(b) substantially corresponds to a $\frac{3}{4}$ wavelength, and a support portion 58 serves as a vibration node. For this reason, even if the support portion 58 is fixed to the stator, the vibration mode of each resonator is not adversely affected.

Figure 15A:
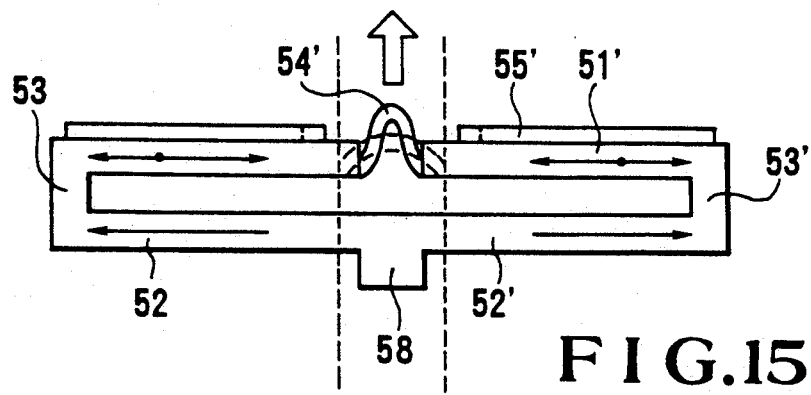
FIGS. 15(a) and 15(b) are views showing the movement of a resonator portion in the embodiment shown in FIGS. 14(a) and 14(b)
Figure 15B:
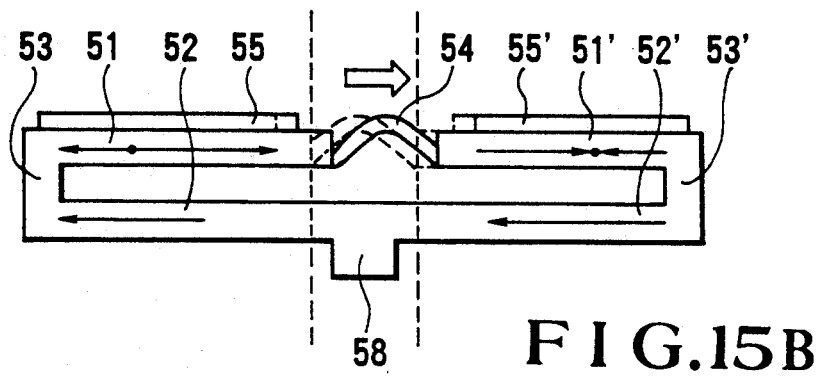

Similar to the embodiment shown in FIGS. 11(a) and 11(b), this low-profile ultrasonic motor has two intrinsic vibration modes, i.e., inphase and opposite-phase modes. FIGS. 15(a) and 15(b) show the vibration displacement directions of the resonator portion. FIGS. 15(a) and 15(b) respectively show the inphase mode and the opposite-phase mode. The broken lines in FIGS. 15(a) and 15(b) indicate the positions of the resonator portion when it is not vibrated. The inphase mode shown in FIG. 15(a) is a vibration mode in which the shell is deformed to expand or contract, so that the shell middle portion is displaced downward. The opposite-phase mode shown in FIG. 15(b) is a vibration mode in which the shell is translated while it is scarcely deformed. The thick arrows in FIGS. 15(a) and 15(b) indicate the directions of the movement of the shell, and the arrows in the resonators indicate the directions of the movement of the arm portions. The vibration modes are the same as those in the embodiment shown in FIGS. 11(a) and 11(b).

A driving method of producing elliptical vibrations at the shell middle portion by resonance driving is the same as that in the embodiment shown in FIGS. 11(a) and 11(b) described with reference to FIGS. 8(a) to 8(d).

Note that the convex shell 54 may have the shapes shown in FIGS. 10(a) and 10(b).

In this embodiment, since the stator is a closed structure as a whole, and this closed structure ensures high structural strength against a contact force F, the contact F can be increased.

A low-profile ultrasonic motor according to still another embodiment of the present invention will be described below.

Figure 16A:
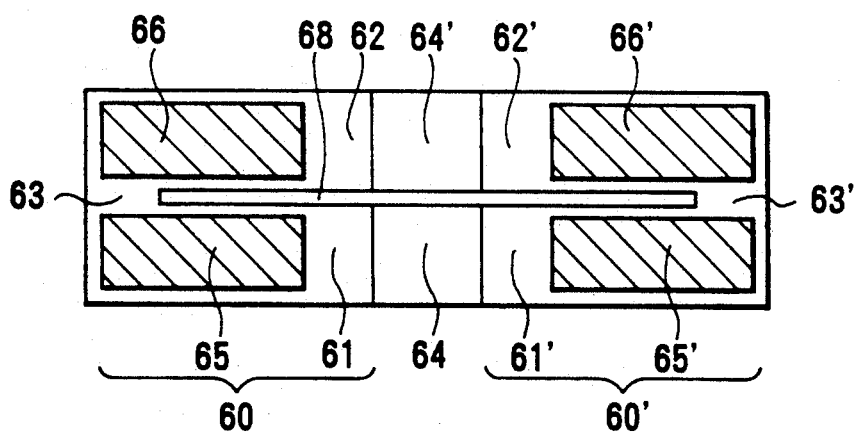
FIGS. 16(a) and 16(b) are a plan view and a front view showing the basic arrangement of a low-profile ultrasonic motor according to still another embodiment of the present invention.
Figure 16B:
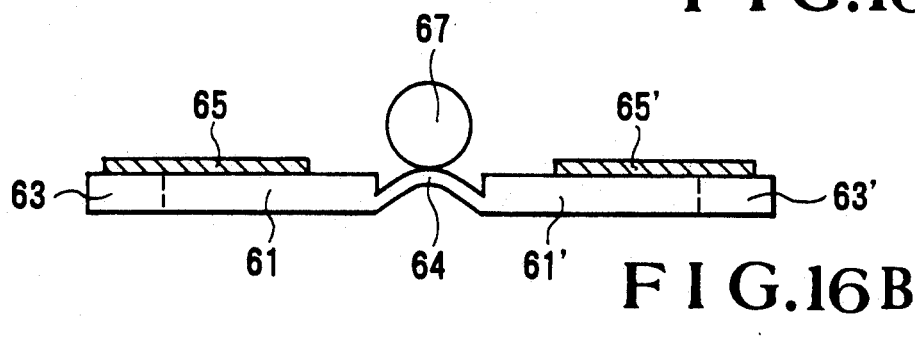

In the low-profile ultrasonic motor of this embodiment shown in FIGS. 16(a) and 16(b), a stator is constituted by two U-shaped stainless steel resonators 60 and 60' bent within a plane and arranged to oppose each other, and convex shells 64 and 64' integrally fixed to the end portions of the resonators 60 and 60', respectively. The U-shaped resonator 60 is formed into a U shape by arm portions 61 and 62. The U-shaped resonator 60' is formed into a U shape by arm portions 61' and 62'. The distal end portions of the arm portions 61 and 61' are connected to each other through the convex shell 64, whereas the distal end portions of the arm portions 62 and 62' are connected to each other through the convex shell 64'.

Piezoelectric ceramic elements 65 and 65' are respectively bonded to the arm portions 61 and 61' with an epoxy adhesive agent to have opposite polarization directions. Similarly, piezoelectric ceramic elements 66 and 66' are respectively bonded to the arm portions 62 and 62' with an epoxy adhesive agent to have opposite polarization directions. A brass roller 67 is urged against a protruding arcuated middle portion of the convex shell 64 with a contact force of, e.g., 6 kgf. The roller 67 may also be arranged in contact with the convex shell 64' to be driven at the two positions.

The dimensions of the low-profile ultrasonic motor having the above-described arrangement are: the length of the resonator portion is 25 mm; the arm thickness of the resonator portion, 2 mm; the slit width, 0.5 mm; the length of each convex shell portion, 6 mm (radius of curvature: 4 mm); the total length of the stator, 60 mm; the height, 8 mm; and the diameter of the roller, 8 mm.

In this low-profile ultrasonic motor, 47.59-kHz, 50-$V_{rms}$ high-frequency voltages having the same phase were applied to the piezoelectric ceramic elements 65 and 66, while high-frequency voltages with a phase difference of 90° with respect to the voltages applied to the elements 65 and 66 were applied to the piezoelectric ceramic elements 65' and 66', thereby driving the elements, in the resonance mode. As a result, the roller was rotated in one direction at a rotational speed of 620 rpm. When the phase difference was changed to $-90°$, the roller 67 was rotated in the opposite direction at the same rotational speed. When torque characteristics relative to the rotational speed of the roller 67 were measured, a starting torque of 1.6 kgf·cm was obtained.

This low-profile ultrasonic motor is characterized in that the arm portions 61 and 62, and 61' and 62' of the U-shaped resonators 60 and 60' of the stator positively utilize the vibration mode in which while one arm portion expands, the other arm portion contracts. The vibration mode of each U-shaped resonator can be excited in the following manner. In this case, the U-shaped resonator 60 on the left side in FIG. 16(a) will be described below with reference to FIG. 17.

Figure 17:
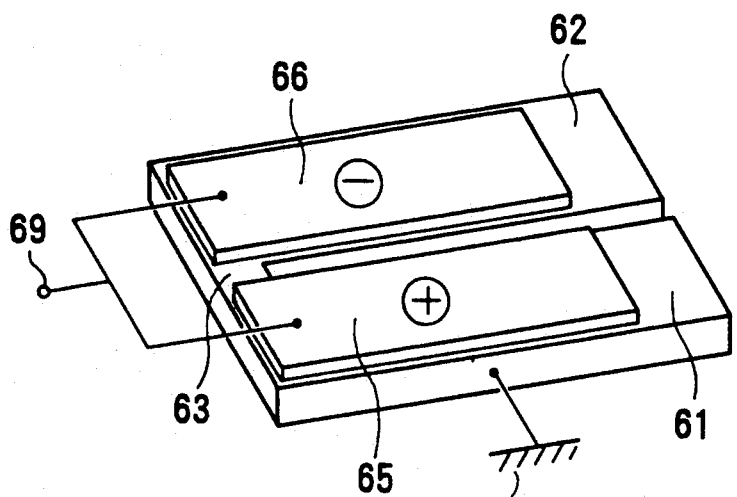
FIG. 17 is a perspective view showing one of resonators in the embodiment shown in FIGS. 16(a) and 16(b)

Referring to FIG. 17, the piezoelectric ceramic elements 65 and 66 are respectively bonded to the arm portions 61 and 62 and a bottom portion 63 of the resonator to have opposite polarities. The signs "+" and "−" exemplify the polarities of the piezoelectric ceramic elements. Leads are respectively extracted, as integral parts, from the upper surfaces of the piezoelectric ceramic elements 65 and 66 and are connected to an electrical terminal 69. In addition, a ground terminal 70 is extracted from the U-shaped resonator consisting of a metal plate. The above-described mode can be excited by applying an AC voltage between the electrical terminal 69 and the ground terminal 70.

In this low-profile ultrasonic motor, vibration nodes exist in the bottom portions 63 and 63' of the U-shaped resonators during a resonance driving operation, and substantially λ/4 vertical waves appear on the respective arm portions 61, 62, 61' and 62'. Therefore, the Q value in the resonance mode is high, and a reduction in size in the longitudinal direction can be achieved.

Since each of the convex shells 64 and 64' has an arcuated shape, each shell can achieve far greater stiffness against the contact force F from the roller than the conventional vertical flexural flat plate.

Assume that the convex shell has an arcuated shape, a shell thickness of 1 mm, a curvature radius of 4 mm, and a width of 10 mm, and a contact force of 10 kgf is applied to the convex shell. In this case, the shell is deformed in a direction to increase the radius of curvature. According to an experiment, however, the deformation amount is as small as 2 μm or less. Therefore, a contact force much larger than that applied to the vertical flexural plate can be applied to the shell. Consequently, similar to the above-described embodiments, a high thrust can be obtained.

The operation principle of the low-profile ultrasonic motor of this embodiment will be described next.

Figure 18A:
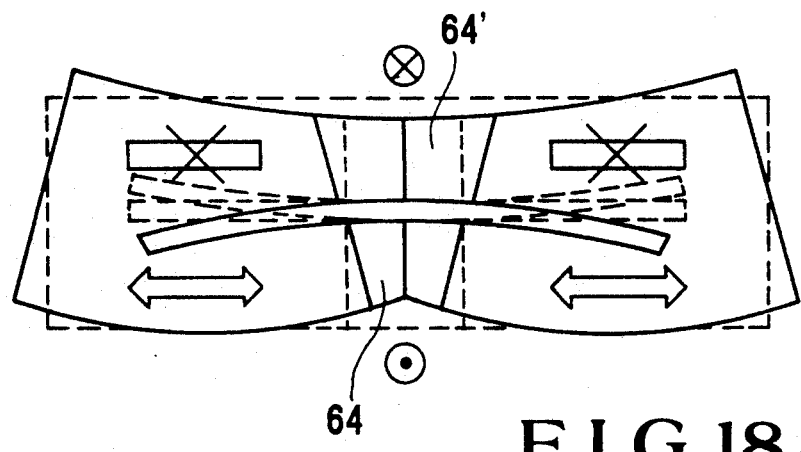
FIGS. 18(a) and 18(b) are views showing the movement of a resonator portion in the embodiment in FIGS. 16(a) and 16(b)
Figure 18B:
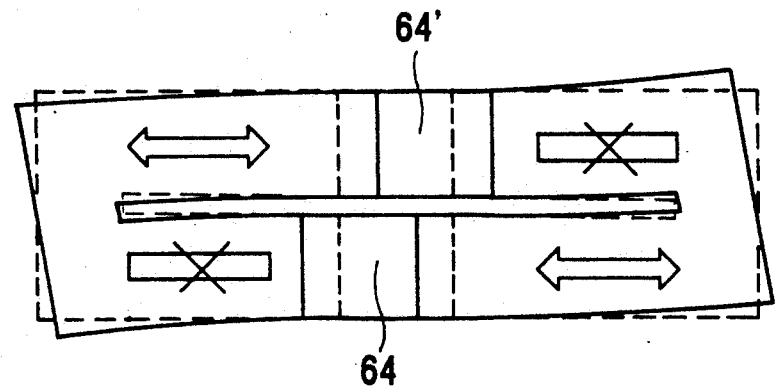
Figure 19A:
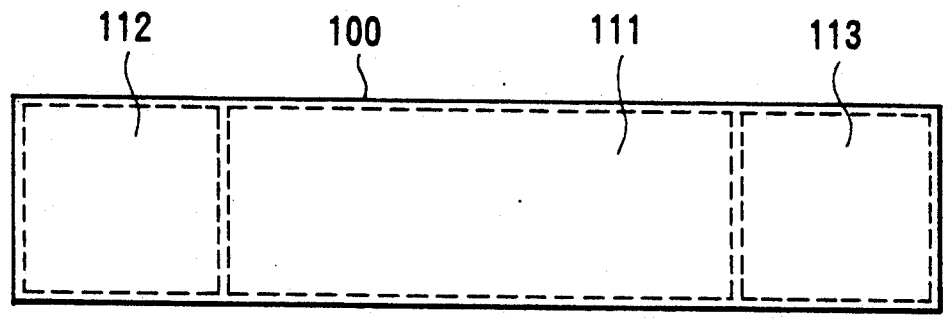
FIGS. 19(a) and 19(b) are views showing the structure of a conventional vertical flexural double mode flat vibrator.
Figure 19B:
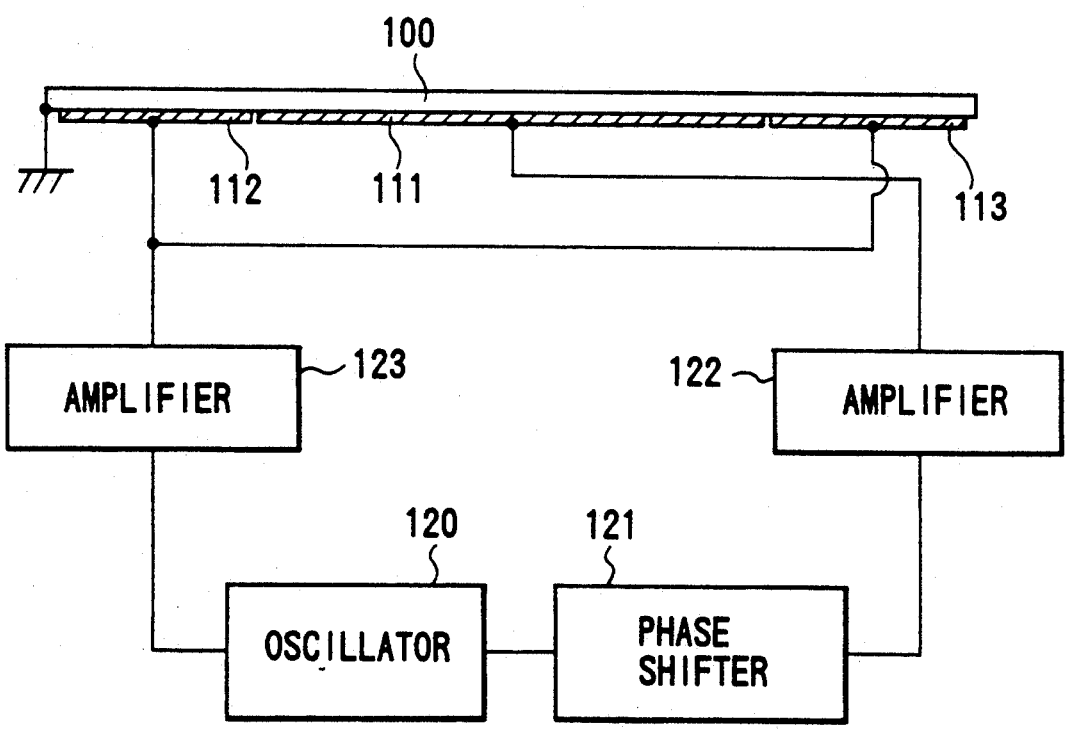
Figure 20A:
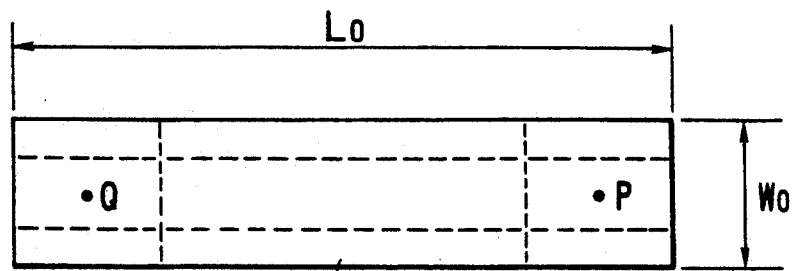
FIGS. 20(a) and 20(b) are views showing vibration modes of the double mode flat vibrator.
Figure 20B:
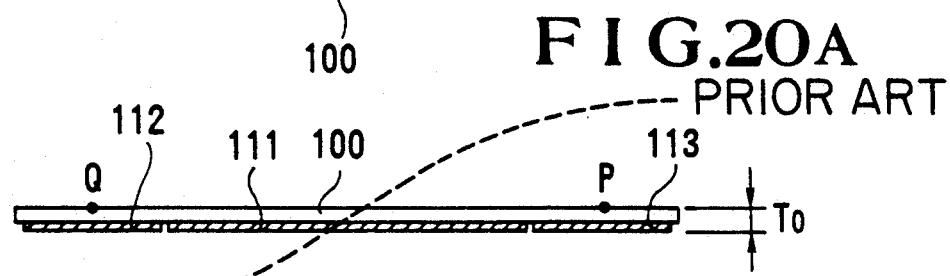
Figure 21:
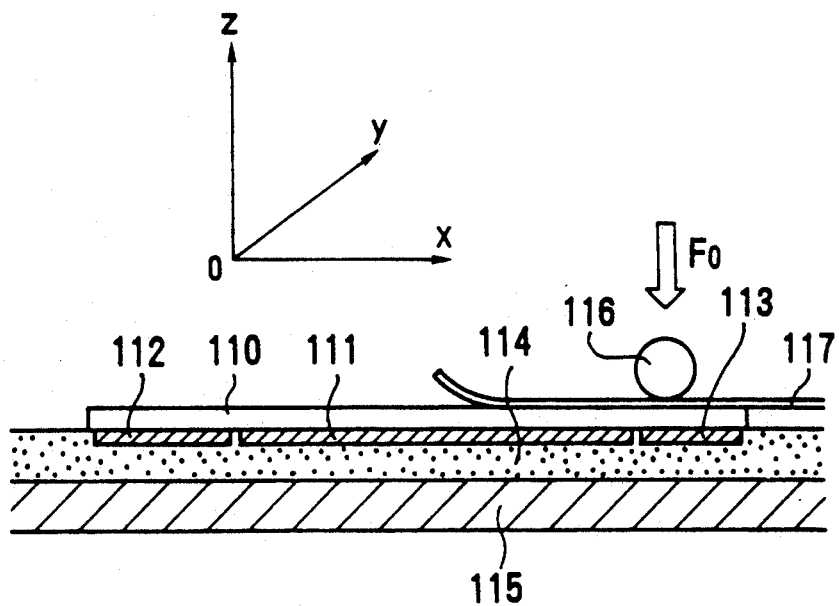
FIG. 21 is a front view showing a main part of an ultrasonic sheet feeder using a conventional vertical flexural double mode flat vibrator.

This motor uses two intrinsic vibration modes, i.e., inphase and opposite-phase modes. FIGS. 18(a) and 18(b) show the vibration displacement directions of the resonator and shell portions in the resonance mode. FIGS. 18(a) and 18(b) respectively show the inphase and opposite-phase modes. Referring to FIGS. 18(a) and 18(b), the broken lines indicate the positions of the resonator and shell portions when they are not vibrated. In the inphase mode shown in FIG. 18(a), the shells are deformed to contract or expand, so that the middle portion of the convex shell 64' is deformed downward in the vertical direction, while the middle portion of the convex shell 64 is deformed upward in the vertical direction.

The opposite-phase mode shown in FIG. 18(b) is a vibration mode in which each shell is translated while it is scarcely deformed. Referring to FIGS. 18(a) and 18(b), the arrows in the arm portions indicate the directions of the movement of the arm portions, and the arrows in the shell portions indicate the directions of the movement of the shell portions. It is apparent from the directions of the movement indicated in FIGS. 18(a) and 18(b) that the shells 64 and 64' are moved in opposite directions, i.e., with a phase difference of 180°. In the inphase mode, each shell serves as a stiffness component because it is deformed. In the opposite-phase mode, each shell serves as a mass because it is translated with almost no deformation. This operation is the same as that in each embodiment described above.

A driving method of producing elliptical vibrations at the shell middle portion by resonance driving is the same as that described with reference to FIGS. 8(a) to 9(b).

In this embodiment, each of the convex shells 64 and 64' is brought into contact with the roller once per period of elliptical movement. That is, since the shells and the roller come into contact with each other twice in one period of elliptical movement, a driving force for the roller is twice that of the motor using a single shell. In addition, by applying voltages having phase differences of 90° and 270° between the piezoelectric ceramic elements of the resonators 60 and 60', the roller can be easily rotated clockwise and counterclockwise.

Referring to FIGS. 16(a) and 16(b), the bottom portions 63 and 63' of the U-shaped resonators swing during a resonance driving operation. If the bottom portions 63 and 63' are increased in thickness, the resonance frequency can be decreased owing to the mass effect. Therefore, a decrease in driving frequency can be achieved.

Even if the convex shells 64 and 64' have the shapes shown in FIGS. 10(a) and 10(b) other than the shape shown in FIGS. 16(a) and 16(b), the same function as described above can be obtained.

As has been described above, according to the present invention, there is provided a low-profile, large-thrust, high-torque ultrasonic sheet feeder and a low-profile ultrasonic motor, which can be applied to devices requiring a large driving force, e.g., facsimile apparatuses, thus presenting tremendous industrial values.

What is claimed is:

1. A low-profile ultrasonic motor comprising:
   a pair of resonators, each having two arm portions in opposing upper and lower relation to each other, and each having a bottom portion formed by connecting one end of one of the arm portions to a corresponding one end of the other arm portion, and each of said pair resonators having a U-shaped longitudinal section;
   a convex shell having a protruding middle portion and being connected to the other end of one of said two arm portions of one of said pair of resonators and being connected to the other end of a corresponding one of said two arm portions of the other of said pair of resonators;
   piezoelectric ceramic elements respectively mounted on one of the arm portions of each of said pair of resonators; and
   a roller urged into opposing relation with the middle portion of said convex shell.

2. A low-profile ultrasonic motor according to claim 1, wherein said piezoelectric ceramic elements are driven at a resonance frequency at which said convex shell is translated, and a phase difference of about 90° is set between vibration displacements output from said piezoelectric ceramic elements to produce elliptical movement of the middle portion of said convex shell, thereby rotating said roller in a resonance mode.

3. A low-profile ultrasonic motor comprising:
   a pair of resonators, each having an upper arm portion and a lower arm portion in opposing relation to each other, and each having a bottom portion formed by connecting one end of the upper arm portion to one end of the lower arm portion, and each of said pair of resonators having a U-shaped longitudinal section;
   a convex shell having a protruding middle portion and being connected to the other end of the upper arm portion of each of said pair of resonators;
   a support portion connected to the other end of the lower arm portion of each of said pair of resonators;
   piezoelectric ceramic elements respectively mounted on the upper arm portion of each of said pair of resonators; and
   a roller urged into opposing relation with the middle portion of said convex shell.

4. A low-profile ultrasonic motor according to claim 3, wherein said piezoelectric ceramic elements are driven at a resonance frequency at which said convex shell is translated, and a phase difference of about 90° is set between vibration displacements output from said piezoelectric ceramic elements to produce elliptical movement of the middle portion of said convex shell, thereby rotating said roller in a resonance mode.

5. A low-profile ultrasonic motor comprising:
   a pair of resonators, each having two arm portions in opposing side-by-side spaced relation to each other, and each having a bottom portion formed by connecting one end of one of the arm portions to a corresponding one end of the other arm portion, and each of said pair of resonators having a U-shaped cross section;
   a convex shell having a protruding middle portion and being connected to the other end of the arm portions of said pair of resonators;
   piezoelectric ceramic elements having different polarization directions on each of said pair of resonators and being respectively mounted on the arm portions of said pair of resonators; and
   a roller urged into opposing relation with the middle portion of said convex shell.

6. A low-profile ultrasonic motor according to claim 5, wherein said piezoelectric ceramic elements are driven at a resonance frequency at which said convex shell is translated, and a phase difference of about 90° is set between vibration displacements output from the piezoelectric ceramic elements on one of said pair of resonators with respect to the piezoelectric ceramic elements on the other of said pair of resonators to produce elliptical movement of the middle portion of said convex shell, thereby rotating said roller in a resonance mode.

7. A low-profile ultrasonic motor according to claim 5, wherein said convex shell has two convex shell portions each having a protruding middle portion, and each said convex shell portion being connected to said other end of one of the arm portions of one of said pair of resonators and being connected to said other end of a corresponding one of the arm portions of the other of said pair of resonators.

8. A low-profile ultrasonic motor according to claim 6, wherein said convex shell has two convex shell portions each having a protruding middle portion, and each said convex shell portion being connected to said other end of one of the arm portions of one of said pair of resonators and being connected to said other end of a corresponding one of the arm portions of the other of said pair of resonators.

9. A method of driving a low-profile ultrasonic motor, said low-profile ultrasonic motor including a pair of resonators each having two arm portions in opposing upper and lower relation to each other and said pair of resonators each having a bottom portion formed by connecting one end of one of the arm portions to a corresponding one end of the other arm portion and each of said pair of resonators having a U-shaped longitudinal section, a convex shell having a protruding middle portion, said convex shell being connected to the other end of one of said two arm portions of one of said pair of resonators and being connected to the other end of a corresponding one of said two arm portions of the other of said pair of resonators, piezoelectric ceramic elements respectively mounted on one of the arm portions of each of said pair of resonators, and a roller urged into opposing relation with said middle portion of said convex shell, comprising the steps of:
   applying a driving power source to said piezoelectric ceramic elements;
   driving said piezoelectric ceramic elements at a resonance frequency at which said convex shell is translated;
   setting a phase difference of about 90° between vibration displacements output from said piezoelectric ceramic elements to produce elliptical movement of said middle portion of said convex shell; and
   rotating said roller in a resonance mode as said piezoelectric ceramic elements are driven at said resonance frequency.

10. A method of driving a low-profile ultrasonic motor, said low-profile ultrasonic motor including a pair of resonators each having an upper arm portion and a lower arm portion in opposing relation to each other and each of said pair of resonators having a bottom portion formed by connecting one end of the upper arm portion to one end of the lower arm portion and each of said pair of resonators having a U-shaped longitudinal section, a convex shell having a protruding middle portion and said convex shell being connected to the other end of the upper arm portion of each of said pair of resonators, a support portion connected to the other end of the lower arm portion of each of said pair of resonators, piezoelectric ceramic elements respectively mounted on the upper arm portion of each of said pair of resonators, and a roller urged into opposing relation with said middle portion of said convex shell, comprising the steps of:

applying a driving power source to said piezoelectric ceramic elements;

driving said piezoelectric ceramic elements at a resonance frequency at which said convex shell is translated;

setting a phase difference of about 90° between vibration displacements output from said piezoelectric ceramic elements to produce elliptical movement of said middle portion of said convex shell; and rotating said roller in a resonance mode as said piezoelectric ceramic elements are driven at said resonance frequency.

11. A method of driving a low-profile ultrasonic motor, said low-profile ultrasonic motor including a pair of resonators each having two arm portions in opposing side-by-side spaced relation to each other and said pair of resonators each having a bottom portion formed by connecting one end of one of the arm portions to a corresponding one end of the other arm portion and each of said pair of resonators having a U-shaped cross section, a convex shell having a protruding a middle portion, said convex shell being connected to the other end of the upper arm portion of each of said pair of resonators, piezoelectric ceramic elements having different polarization directions on each of said pair of resonators and said piezoelectric ceramic elements being respectively mounted on the arm portions of said pair of resonators, and a roller urged into opposing relation with said middle portion of said convex shell, comprising the steps of:

applying a driving power source to said piezoelectric ceramic elements;

driving said piezoelectric ceramic elements at a resonance frequency at which said convex shell is translated;

setting a phase difference of about 90° between vibration displacements output from said piezoelectric ceramic elements on one of said pair of resonators with respect to the piezoelectric ceramic elements on the other of said pair of resonators to produce elliptical movement of said middle portion of said convex shell; and rotating said roller in a resonance mode as said piezoelectric ceramic elements are driven at said resonance frequency.

12. The method of driving a low-profile ultrasonic motor according to claim 11, wherein said driving power source applies high-frequency voltages having the same phase to the piezoelectric ceramic elements on one of said pair of resonators and applies high-frequency voltages to the piezoelectric ceramic elements on the other of said pair of resonators having a phase difference of about 90° with respect to the high-frequency voltages applied to the piezoelectric ceramic elements on said one of said pair of resonators.

13. A method of driving a low-profile ultrasonic motor according to claim 11, wherein said convex shell has two convex shell portions, each of the convex shell portions being connected to said other end of one of the arm portions of one of said pair of resonators and being connected to said other end of a corresponding one of the arm portions of the other of said pair of resonators, and each of the convex shell portions having a protruding middle portion, and wherein said roller is respectively urged into opposing relation with the middle portion of each of the convex shell portions in a period of elliptical movement of the middle portion of the respective convex shell portion.

14. A method of driving a low-profile ultrasonic motor according to claim 13, wherein said driving power source applies high-frequency voltages having the same phase to the piezoelectric ceramic elements on one of said pair of resonators and applies high-frequency voltages to the piezoelectric ceramic elements on the other of said pair of resonators having a phase difference of about 90° with respect to the high-frequency voltages applies to the piezoelectric ceramic elements on said one of said pair of resonators.

15. A method of driving a low-profile ultrasonic motor, said low-profile ultrasonic motor including a pair of resonators each having two arm portions in opposing side-by-side spaced relation to each other and said pair of resonators each having a bottom portion formed by connecting one end of one of the arm portions to a corresponding one end of the other arm portion and each of said pair of resonators having a U-shaped cross section, a convex shell having a protruding a middle portion, said convex shell being connected to the other end of the upper arm portion of each of said pair of resonators, piezoelectric ceramic elements having different polarization directions on each of said pair of resonators and said piezoelectric ceramic elements being respectively mounted on the arm portions of said pair of resonators, and a roller urged into opposing relation with said middle portion of said convex shell, comprising the steps of:

applying a driving power source to said piezoelectric ceramic elements;

driving said piezoelectric ceramic elements at a resonance frequency at which said convex shell is translated;

setting a phase difference of at least one of about 90° and about 270° between vibration displacements output from said piezoelectric ceramic elements on one of said pair of resonators with respect to the piezoelectric ceramic elements on the other of said pair of resonators to produce elliptical movement of said middle portion of said convex shell; and rotating said roller in a resonance mode as said piezoelectric ceramic elements are driven at said resonance frequency.

16. A method of driving a low-profile ultrasonic motor according to claim 15, wherein said driving power source applies high-frequency voltages having the same phase to the piezoelectric ceramic elements on one of said pair of resonators and applies high-frequency voltages to the piezoelectric ceramic elements on the other of said pair of resonators having a phase difference of at least one of about 90° and about 270° with respect to the high-frequency voltages applied to the piezoelectric ceramic elements on said one of said pair of resonators.

17. A method of driving a low-profile ultrasonic motor according to claim 15, wherein said convex shell has two convex shell portions, each of the convex shell portions being connected to said other end of one of the arm portions of one of said pair of resonators and being connected to said other end of a corresponding one of the arm portions of the other of said pair of resonators, and each of the convex shell portions having a protruding middle portion, and wherein said roller is respectively urged into opposing relation with the middle portion of each of the convex shell portions in a period of elliptical movement of the middle portion of the respective convex shell portion.

18. A method of driving a low-profile ultrasonic motor according to claim 17, wherein said driving power source applies high-frequency voltages having the same phase to the piezoelectric ceramic elements on one of said pair of resonators and applies high-frequency voltages to the piezoelectric ceramic elements on the other of said pair of resonators having a phase difference of at least one of about 90° and about 270° with respect to the high-frequency voltages applied to the piezoelectric ceramic elements on said one of said pair of resonators.

* * * * *